United States Patent
Dent et al.

(10) Patent No.: US 8,379,782 B2
(45) Date of Patent: Feb. 19, 2013

(54) MOBILE RADIO CHANNEL ESTIMATION

(75) Inventors: Paul Wilkinson Dent, Pittsboro, NC (US); Leonid Krasny, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 867 days.

(21) Appl. No.: 12/478,473

(22) Filed: Jun. 4, 2009

(65) Prior Publication Data

US 2010/0309994 A1   Dec. 9, 2010

(51) Int. Cl.
*H04B 1/10* (2006.01)

(52) U.S. Cl. ......... 375/349; 340/554; 342/84; 342/171; 342/357.78; 375/260; 370/210

(58) Field of Classification Search .................. None
See application file for complete search history.

(56) References Cited

U.S. PATENT DOCUMENTS

| | | | | |
|---|---|---|---|---|
| 2005/0024232 A1* | 2/2005 | Gardner et al. | ............ | 340/854.4 |
| 2005/0163257 A1* | 7/2005 | Keerthi | ............ | 375/340 |
| 2007/0047671 A1* | 3/2007 | Chen | ............ | 375/326 |
| 2010/0183104 A1* | 7/2010 | Alexander et al. | ............ | 375/346 |

OTHER PUBLICATIONS

Lim Jun-Seok et al.: "Multipath channel parameter estimation not requiring prior information of the number of received rays" Electronics Letters, IEE Stevenage, GB LNKD-DOI:10.1049/EL:19951494, vol. 31, No. 25, XP006003751 ISSN: 0013-5194, pp. 2150-2152, Dec. 7, 1995.

* cited by examiner

*Primary Examiner* — David C. Payne
*Assistant Examiner* — Adolf Dsouza

(57) ABSTRACT

The described method characterizes scattering objects in a wireless channel. The present invention determines non-equally spaced path delays and Doppler parameters for a plurality of scattering objects in a wireless channel. More particularly, a frequency-to-time transform applied to a plurality of OFDM pilot samples received over a plurality of OFDM symbol periods generates a set of non-equally spaced path delays and a set of associated complex delay coefficients. Further, a time-to-frequency transform applied to the complex delay coefficients determined for one path delay over multiple OFDM symbol periods generates a set of Doppler parameters comprising a plurality of non-equally spaced Doppler frequencies and their corresponding scattering coefficients for that path delay.

32 Claims, 9 Drawing Sheets

— LINE OF SIGHT DELAY
—·— ELLIPSE 1 DELAY
------ ELLIPSE 2 DELAY

MOBILE RADIO CHANNEL ESTIMATION

BACKGROUND

The present invention relates generally to channel estimation, and more particularly, to improving the accuracy of scattering object characterizations used to determine channel estimates.

In a wireless communication system, a transmitted signal reflects off objects (e.g. buildings, hills, etc.) in the environment, referred to herein as scattering objects. The reflections arrive at a receiver from different directions and with different delays. The reflections or multi-paths can be characterized by a path delay and a complex delay coefficient. The complex delay coefficients show fast temporal variation due to the mobility of the vehicle while the path delays are relatively constant over a large number of OFDM symbol periods.

Channel estimation is the process of characterizing the effect of the radio channel on the transmitted signal. Channel estimates approximating the effect of the channel on the transmitted signal may be used for interference cancellation, diversity combining, ML detection, and other purposes. Many channel estimation techniques in common use do not produce sufficiently accurate estimates of the channel for use by higher order modulations. Further, it is difficult to predict how the channel will change due to the mobility of the vehicle. Therefore, there is a need for new channel estimation techniques that will produce more accurate channel estimates for higher order modulation and enable prediction of the channel from current channel estimates.

SUMMARY

The present invention provides an improved channel estimation technique that determines accurate characterizations of the scattering objects in the wireless channel, and uses the scattering object characterizations to generate accurate channel estimates. To that end, a receiver according to the present invention applies a modified frequency transform to received signal samples to determine the actual path delays and the associated complex delay coefficients for the scattering objects in a multi-path channel. The receiver may further characterize the scattering objects by determining the Doppler frequency shifts associated with each scattering object to characterize the temporal variation of the complex coefficients. Based on the resulting path delay and Doppler frequency information, the receiver determines accurate channel estimates. Because the path delays and Doppler parameters are more accurate than those provided by prior art solutions, the channel estimates derived from these path delays and Doppler parameters are also more accurate. Thus, the resulting channel estimates are useful for higher order modulation processing, channel prediction, etc.

To determine the actual path delays and associated complex delay coefficients, the receiver applies a modified frequency-to-time transform to a plurality of signal samples received at a plurality of evenly spaced frequencies to generate a set of non-equally spaced path delays and a set of associated complex delay coefficients. In one embodiment, two or more of the non-equally spaced path delays correspond to non-integer multiples of a signal sampling period. To determine the Doppler parameters, the receiver applies a time-to-frequency transform to individual sets of complex delay coefficients determined for individual path delays over multiple equally spaced time intervals. The resulting sets of Doppler parameters comprise a plurality of non-equally spaced Doppler frequencies and their corresponding scattering coefficients for individual path delays.

In one exemplary embodiment, the wireless receiver generates a plurality of OFDM signal samples corresponding to a plurality of OFDM subcarrier frequencies from a received OFDM signal. The receiver applies a modified frequency-to-time transform, e.g., an inverse modified Prony algorithm, to the signal samples to determine a set of non-equally spaced path delays and a set of associated complex delay coefficients, where the non-equally spaced path delays are non-integer multiples of a signal sampling period. Each of the path delays and associated complex delay coefficient correspond to one or more scattering objects in the wireless channel. The receiver then applies a time-to-frequency transform, e.g., a Prony algorithm, to individual sets of complex delay coefficients determined for individual path delays over multiple OFDM symbol periods. The result provides a set of Doppler parameters for individual path delays. Each set of Doppler parameters comprises a plurality of non-equally spaced Doppler frequencies and their corresponding complex scattering coefficients, wherein each scattering coefficient corresponds to a respective scattering object in the wireless channel. The receiver uses the Doppler parameters and the corresponding path delays to determine the channel estimates.

DETAILED DESCRIPTION

Transmitted signals traveling through wireless communication channels typically encounter several scattering objects, e.g., buildings, mountains, trees, etc., before reaching a receiver. As used herein, the term "scattering object" refers to both single scattering objects and clusters of scattering objects that are too close to separate. Channel estimation is the process of characterizing the effect of these scattering objects on the transmitted signal. Channel estimates approximating the effect of the channel on the transmitted signal may be used for interference cancellation, diversity combining, ML detection, and other purposes. Channel estimates typically used by receivers can include complex coefficients of the channel impulse response at a number of equally-spaced delays, e.g., equally-spaced chip delays in a CDMA (Code Division Multiple Access) system, as well as complex coefficients indicative of the channel frequency response at a number of equally-spaced frequencies, e.g., equally-spaced subcarrier frequencies in an OFDM (Orthogonal Frequency Division Multiplex) system. The present invention provides a method for characterizing the scattering objects so that the receiver can determine accurate channel estimates for any desired time period, e.g., a future time period.

Figure 1:
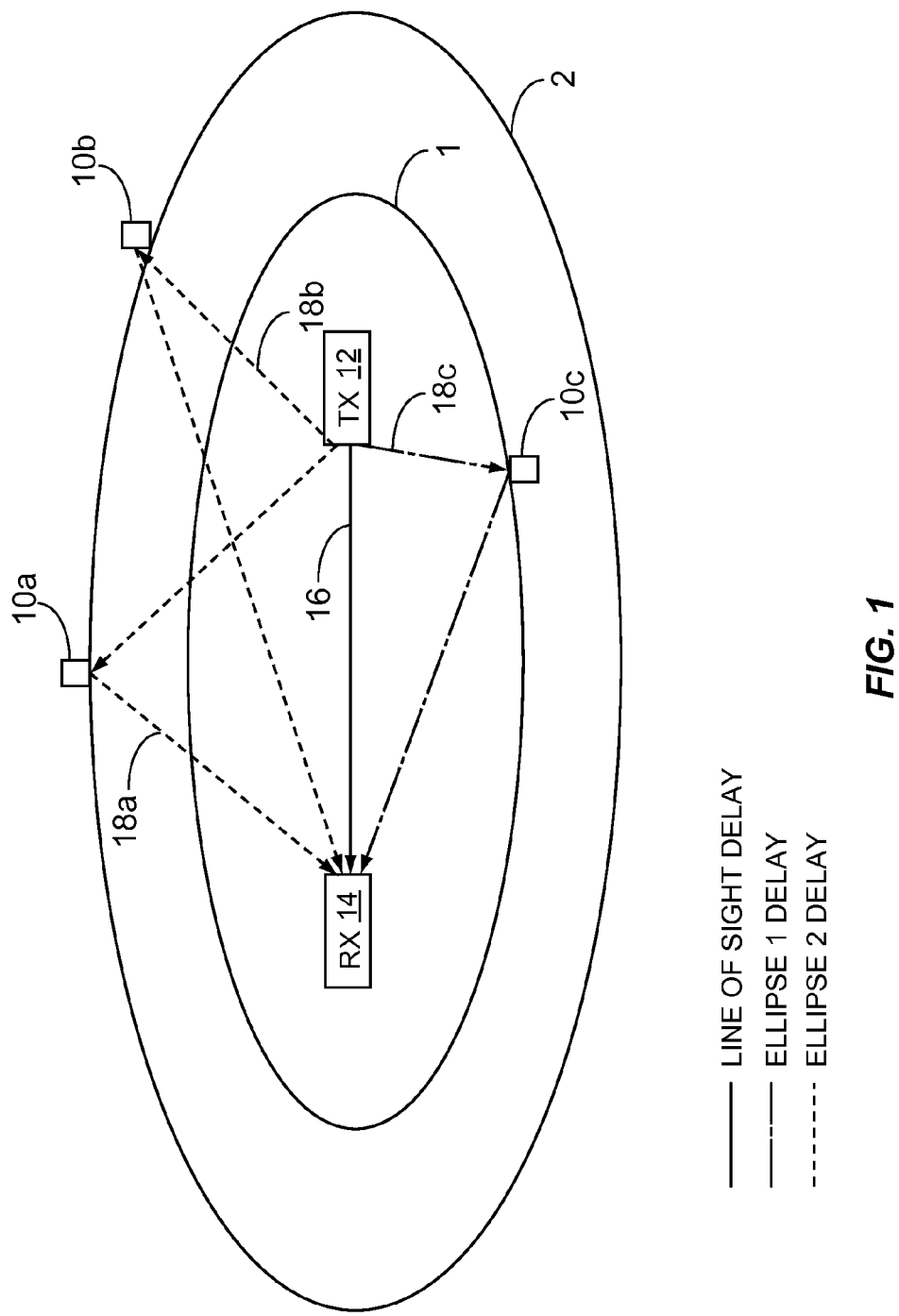
FIG. 1 shows the relationship between different scattering objects and different path delays relative to a transmitter and receiver in a wireless system.

In order to characterize the scattering objects, the receiver determines the path delays, complex delay coefficients, and/or Doppler parameters corresponding to the scattering objects. Ideally, each scattering object in the multi-path channel corresponds to a different path delay. However, there are scenarios where different scattering objects cause reflected signals to have the same path delay even though the reflected signals traverse different paths. For example, FIG. 1 shows a plurality of ellipses surrounding a transmitter 12 and a receiver 14, where the transmitter 12 and receiver 14 mark the foci of the ellipses, where a scattering object 10 falls on one of the ellipses, and where different ellipses correspond to different path delays. Thus, the paths of different scattering objects 10 positioned along the same ellipse have the same path delay, while the paths of different scattering objects 10 positioned along different ellipses have different path delays. For example, scattering objects 10a, 10b both fall on ellipse 2, while scattering object 10c falls on ellipse 1. Thus, the path delay associated with path 18c differs from the path delay associated with path 18a or path 18b, where path 18a and path 18b both have the same path delay. Because scattering objects 10a and 10b apply the same path delay to a transmitted signal, receiver 14 cannot use path delay alone to distinguish scattering object 10a associated with path 18a from scattering object 10b associated path 18b.

Figure 2:
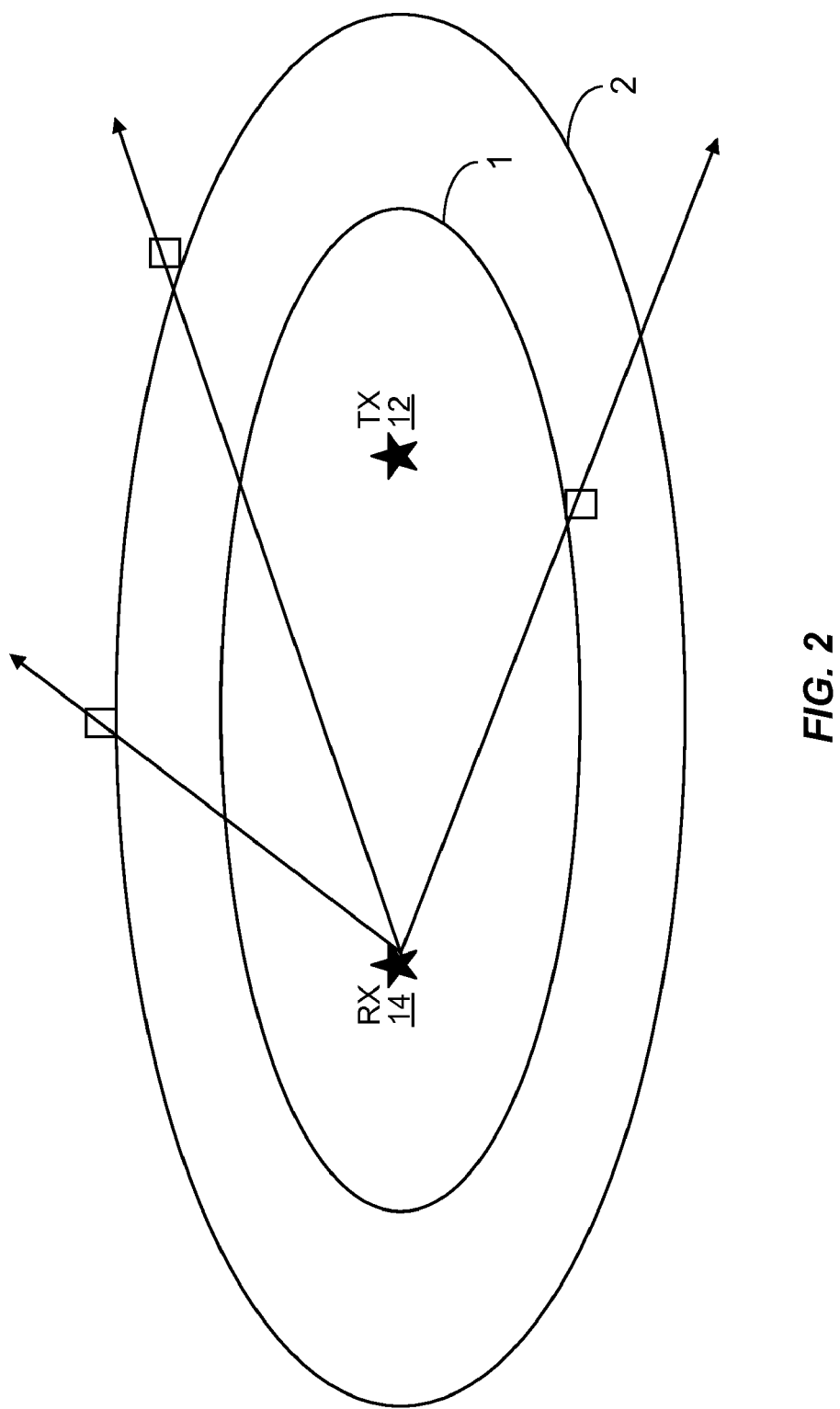
FIG. 2 shows exemplary Doppler frequency vectors associated with the scattering objects relative to the receiver at a particular instant of time.

Because path delay alone cannot be used to characterize the scattering objects 10, the receiver 14 may use another characterizing parameter, such as a Doppler parameter, to further characterize and distinguish the different scattering objects 10. As transmitter 12 and/or receiver 14 moves, the complex delay coefficient associated each scattering object 10 rotates in phase, which results in the effect known as a Doppler shift, even when the transmitter and/or receiver movement is too small to cause an appreciable change in the path delay. FIG. 2 shows an example of the different Doppler frequency vectors associated with the scattering objects relative to a moving receiver 14 at a particular instant of time. By determining how the Doppler effect changes the complex delay coefficients over time, e.g., over multiple OFDM symbol periods, receiver 14 may distinguish different paths 18 having the same path delay but caused by different scattering objects 10. U.S. Pat. No. 6,507,602 to Applicant Dent provides one method for determining the Doppler characteristics of scattering objects.

The prior art, e.g., the '602 patent, provides various ways to determine the Doppler frequency. However, the margin of error with respect to path delay and Doppler frequency estimation associated with such conventional solutions is typically too large to provide the channel estimation accuracy required for higher order modulation systems, e.g., OFDM systems using higher order modulation, such as 256 QAM. Further, the accuracy of conventional solutions is insufficient for channel prediction efforts, e.g., determining accurate channel estimates for a future time period. Thus, alternate solutions are required.

The present invention provides a channel estimation method that produces channel estimates with better accuracy than achieved by prior art solutions. The following describes the present invention in terms of OFDM signal samples in multiple received OFDM symbols. It will be appreciated, however, that the present invention applies to any group of signal samples corresponding to different frequencies that are used by a receiver 14 to characterize a wireless communication channel and/or scattering objects within the wireless communication channel.

Broadly, the present invention determines the actual path delay and Doppler parameter information for a plurality of scattering objects in a wireless channel. Based on the path delay and Doppler frequency information, the receiver determines channel estimates useful for higher order modulation processing, channel prediction, etc. More particularly, the receiver 14 applies a frequency-to-time transform to a plurality of OFDM subcarrier signal samples received over a plurality of OFDM symbol periods to determine a set of non-equally spaced path delays and a set of associated complex delay coefficients. Further, the receiver 14 applies a time-to-frequency transform to the complex delay coefficients determined for individual path delays over multiple OFDM symbol periods to determine a set of Doppler parameters comprising a plurality of non-equally spaced Doppler frequencies and their corresponding scattering coefficients for individual path delays.

Because the transform operations of the present invention are not constrained to determining output values at equally spaced time or frequency intervals, the non-equally spaced path delays, the associated complex delay coefficients, and the associated Doppler parameter sets have fewer errors than those produced by conventional techniques. The transform operations described herein therefore fully characterize the scattering objects 10 while avoiding the accuracy problems of the prior art. The increased accuracy of the resulting scattering object characterizations enable the receiver 14 to better determine channel estimates for operations requiring such highly accurate channel estimates, e.g., higher order modulation processing and channel prediction operations.

Figure 3:
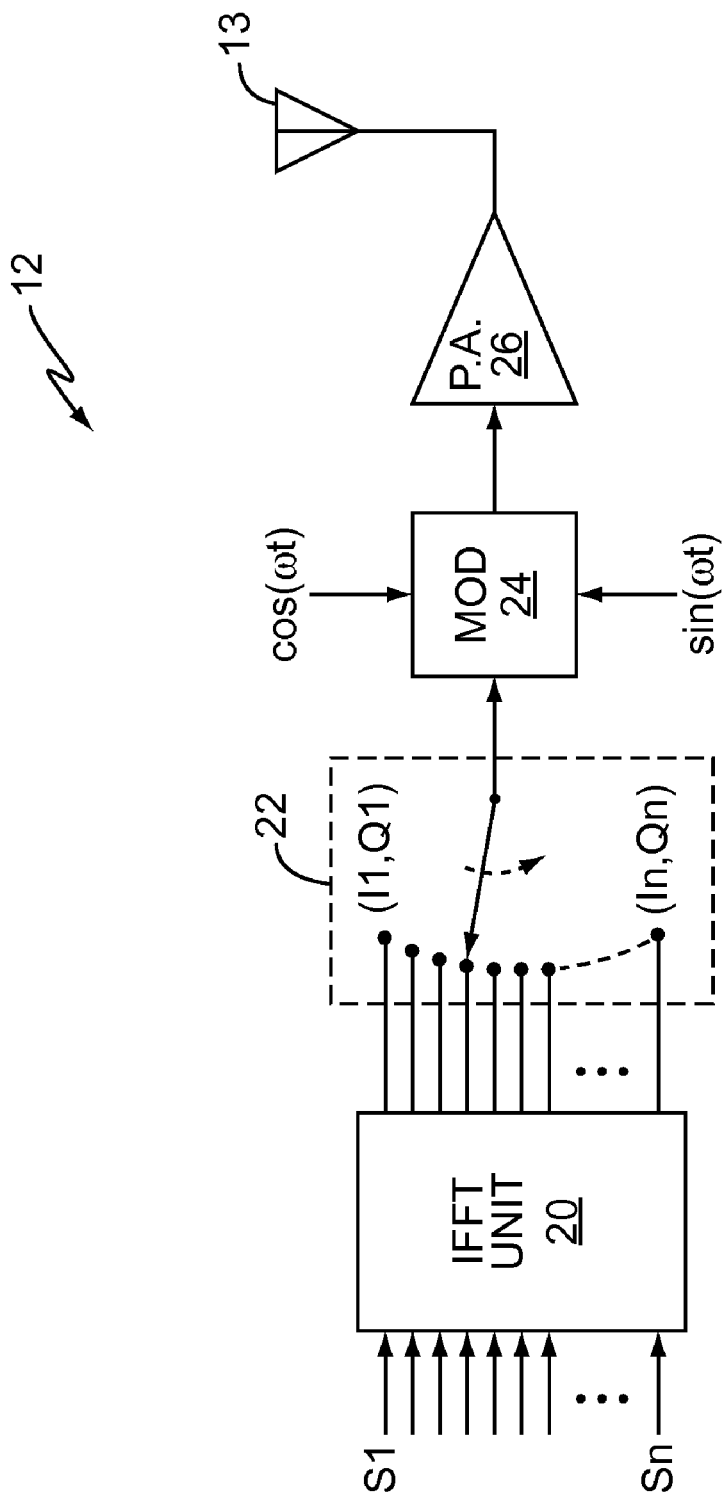
FIG. 3 shows an exemplary transmitter.
Figure 4:
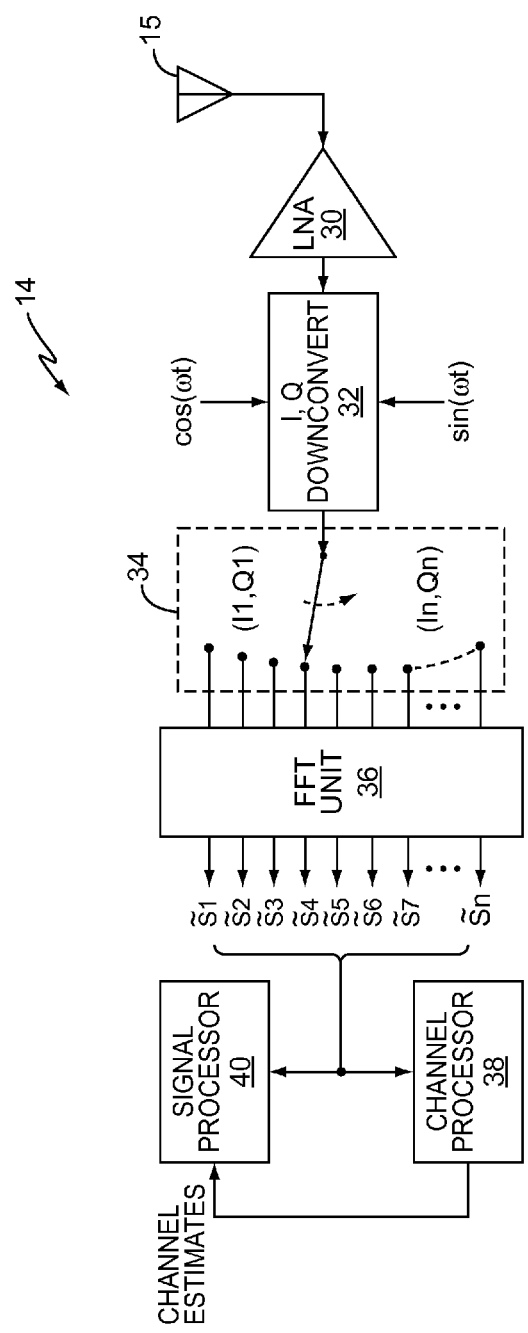
FIG. 4 shows an exemplary receiver according to an exemplary embodiment of the present invention.

To facilitate the detailed explanation of the present invention, FIGS. 3 and 4 first show simplified internal details of an exemplary OFDM transmitter 12 and OFDM receiver 14, respectively. Transmitter 12 comprises an antenna 13, Inverse Fourier transform unit 20, parallel-to-serial converter 22, modulator 24, and power amplifier 26. Generally, the transmitter uses an Inverse Discrete Fourier Transform (IDFT) to encode symbols, and the receiver uses a Discrete Fourier Transform (DFT) to decode signals. However, the IDFT and DFT may be interchanged, and are so similar that they are simply referred to herein as Fourier Transform units 20. Signal values to be transmitted (S1 ... Sn) are input to the Fourier transform unit 20 which may be a specialized, hardwired FFT (or IFFT) circuit or a DSP implementation. Fourier transform unit 20 transforms the n input values to at least n output values. It is advantageous to use more than n output values, termed "over-sampling". For example, n=700 input values could be transformed to m=1024 output values, using a 1024-point FFT. The 524 unused inputs would be set to zero, representing 262 empty spectral bins on either side of the 700 spectral bins used for the 700 input values. Oversampling simplifies subsequent anti-aliasing filtering needed to limit out-of-band spectral energy.

Parallel-to-serial unit 22 converts the output values of the Fourier transform unit 20 to serial form by selecting them successively in a fixed order. Each value is complex, so the serial stream comprises a stream of real parts and a stream of imaginary parts, i.e., a stream of (I, Q) values. The stream of I-values and the stream of Q-values are converted to continuous-time I and Q signals by digital-to-analog conversion and filtering within modulator 24. The filter frequency response is required to pass frequencies corresponding to the used spectral bins, e.g., the 700 bins exemplified above, while attenuating frequencies beyond the exemplary 1024 bins. Thus, oversampling leaves a margin between the required passband and the required stop band so that the filter is not required to have an impossibly steep rate of cut-off. The modulator 24 further uses the continuous-time I and Q signals to modulate cosine and sine wave carrier frequency signals, respectively, to generate an OFDM modulated radio frequency signal, which is amplified to a transmit power level in amplifier 26 and transmitted via antenna 13.

FIG. 4 shows a receiver 14 according to one exemplary embodiment of the present invention. Receiver 14 comprises an antenna 15, front-end receiver elements (e.g., amplifier 30, down converter 32, serial-to-parallel converter 34, and Fourier transform unit 36), channel processor 38, and signal processor 40. The front-end receiver elements generate a plurality of signal samples corresponding to a plurality of frequencies from a signal received via antenna 15. More particularly, amplifier 30 amplifies an OFDM symbol received via antenna 15, and down converter 32 down converts the amplified OFDM symbol to the complex digital baseband. The down converter 32 may comprise any known down converter that has means to select an operating frequency, means to filter the received signal to select the signal bandwidth centered on the selected operating frequency, and means to sample and analog-to-digital convert the filtered signal to generate the complex digital I, Q signals. For example, down converter 32 may comprise a zero-IF or homodyne down converter, a low-IF down converter, or a conventional superheterodyne down converter in which the final IF signal is demodulated by mixing with cosine and sine reference signal waveforms in a quadrature mixer arrangement. Exemplary down converters include those described by U.S. Pat. No. 5,048,059 (reissued as U.S. Pat. No. RE37,138), U.S. Pat. No. 5,084,669, and 5,070,303.

As in the case of the transmitter 12, it is useful to oversample the filtered signal in order to permit a relaxed specification for the signal selection filters. The digital I, Q samples from the I, Q downconverter are then assembled into a block by serial-to-parallel converter 34, which can for example comprise a DSP memory. The block is then Fourier Transformed by Fourier transform unit 36 which is the reverse or conjugate process to the transmit Fourier transform unit 20. The output of Fourier transform unit 36 comprises the same number of samples as in the input block, which, with oversampling, is greater than n. Only n samples are used however, and the rest, which correspond to out-of-band spectral components not completely suppressed by the signal selection filters, are discarded. The output samples $\tilde{S}1$ to $\tilde{S}n$ correspond to the samples input to the transmitter 12, with the addition of transmission noise and any distortion effects caused by the propagation channel. Channel processor 38 processes samples $\tilde{S}1$ to $\tilde{S}n$ to determine the channel estimates. Signal processor 40 uses the channel estimates to process (e.g., decode) samples $\tilde{S}1$ to $\tilde{S}n$ to recover the transmitted data symbols S1 to Sn.

More particularly, channel processor 38 applies a frequency-to-time transform to the pilot samples within samples $\tilde{S}1$ to $\tilde{S}n$ to determine a set of non-equally spaced path delays and the corresponding complex delay coefficients. It will be appreciated that the frequency-to-time transform may be jointly applied to a matrix of pilot symbols obtained from multiple OFDM symbol periods to determine a matrix of complex delay coefficients, where a given row of the delay coefficient matrix corresponds to a given OFDM symbol period, and where a given column of the delay coefficient matrix corresponds to a given path delay within the set of non-equally spaced path delays. It will further be appreciated that the joint operation may alternately be replaced with an individual operation, where the frequency-to-time transform is individually applied to individual sets of pilot samples from individual OFDM symbol periods. In this case, different rows of the delay coefficient matrix are produced by individual frequency-to-time transform operations applied to signal samples from individual OFDM symbols, where different rows of the matrix correspond to different OFDM symbol periods. The complex delay coefficients in each column of the resulting matrix generally correspond to a common path delay, plus or minus a small path delay differential. It will be appreciated that while the operation of jointly determining a common set of non-equally spaced delays that apply over multiple different OFDM symbol periods represents a preferred implementation, other implementations of the invention may determine the delay values independently for each OFDM symbol period.

Subsequently, channel processor 38 applies a time-to-frequency transform to individual columns of the delay coefficient matrix to determine a Doppler spectrum for each path delay. The determination of a Doppler Spectrum from a column of delay coefficients for a given path delay presumes that the path delay is common to all the OFDM symbol periods of the column, and thus is optimum when the receiver determines the path delays jointly over multiple different OFDM symbol periods. However, individual determination of the path delays could be used for each OFDM symbol period, providing the delay coefficients in individual columns of the matrix are conformed to the same path delay prior to Doppler analysis of the column of complex delay coefficients. This conforming operation may be achieved by rotating each delay coefficient in phase angle by $W_o dT$, where $W_o$ represents the center frequency of the signal, and dT represents the amount of delay change needed to conform the path delay for a complex delay coefficient in a particular column to a common delay for that column.

In any event, each Doppler spectrum comprises a set of determined Doppler parameters, which each comprise a plurality of non-equally spaced Doppler frequencies and their corresponding complex scattering coefficients. Unlike the joint determination of the path delays over different OFDM symbol periods, determining the Doppler spectra is not a joint operation over different path delays. Instead, the channel processor 38 determines the Doppler spectrum individually for a given path delay, e.g., delay column. Collecting different sets of Doppler parameters determined for different ones of the non-equally spaced path delays into a matrix produces a Doppler parameter matrix, where a given column of the Doppler parameter matrix provides a set of Doppler parameters for a given path delay from the set of non-equally spaced path delays, and where each entry in the Doppler parameter matrix comprises at least a Doppler frequency and an associated complex coefficient for that frequency. Channel processor 38 uses the non-equally spaced path delays and corresponding Doppler parameters to characterize the channel, e.g., to determine the channel estimates as described herein or according to any known means. Because the path delays and Doppler parameters have significantly more accuracy than those obtained from conventional approaches, the resulting channel estimates are also significantly more accurate, as discussed above.

The simplified receiver 14 of FIG. 4 was deliberately illustrated in the same form as the simplified transmitter 12 of FIG. 3 to explain how the transmitter 12 and receiver 14 processes are essentially inverses of each other, with the result that n complex samples (S1, S2, . . . , Sn) input to the transmitter 12 appear at the receiver output, effectively establishing n parallel channels of communication. These are normally employed to send digital information, using a suitable modulation constellation to map bit patterns to points in the complex I, Q plane. A practical OFDM communication system comprises many more details than shown in FIGS. 3 and 4, such as pulse shaping, cyclic prefixes, equalizers and such, which, although not essential to an understanding of the current invention, may be found in the following disclosures to the current applicant filed in the United States: "Method and Apparatus for Communicating with Root-Nyquist, Self-Transform Pulse Shapes" (U.S. Patent Provisional Application Ser. No. 60/924,673 filed 25 May 2007, and subsequent PCT Application Serial No. PCT/US08/64743 filed 23 May 2008), "Use of Pilot Code in OFDM and Other Non-CDMA Systems" (U.S. patent application Ser. No. 12/255,343 filed 21 Oct. 2008), and "Compensation of Diagonal ISI in OFDM Signals" (U.S. patent application Ser. No. 12/045,157 filed 10 Mar. 2008), all of which are hereby incorporated by reference herein.

A detailed description of the improved method will be made using an exemplary OFDM transmission scheme. In the following description, reference will be made to different time periods and intervals. A clarification of the different time periods involved will therefore be given first, followed by the details associated with the inventive transforms of the present invention.

A wideband signal is produced by modulating a carrier frequency with a time-waveform that changes rapidly, in a short period that may be termed a modulation interval, a chip period, or the like. This is the shortest time period involved. An OFDM symbol comprises a large number of such modulation intervals—at least as many as there are subcarrier frequencies in the OFDM symbol. The set of modulation samples, spaced in time by the modulation interval, is computed by Inverse Fourier Transforming a set of phases and amplitudes, one per subcarrier frequency. Data symbols are encoded into the choice of each phase and amplitude by some chosen modulation scheme, such as 256 QAM, so that every subcarrier frequency carries a data symbol.

The total duration of the time-waveform output by the IFT is equal to the reciprocal of the subcarrier frequency spacing, and is called the OFDM symbol period. This may be extended by appending a so-called cyclic prefix, but some OFDM systems, known as Pulse-Shaped OFDM, do not need to extend the duration of the OFDM symbol to accommodate a cyclic prefix. In effect, the cyclic repeats of the OFDM symbol in pulse shaped OFDM symbols are permitted to overlap adjacent symbols, and therefore do not add a time-overhead. Therefore the potential use of a cyclic prefix is ignored for the rest of the discussion. A number of OFDM symbols may be collected together over a total analysis time interval, the total analysis time interval therefore being an integral number of OFDM symbol periods.

Reference will be made to various time domains and frequency domains which are also clarified herein. The frequency domain of the signal comprises the frequency span from the first to the last OFDM subcarrier frequency used. The OFDM signal also exists as a time waveform in the signal time domain, which is related to the signal frequency domain by the Fourier Transform.

A second frequency domain arises when looking at variations in signals arriving via scattered rays that are received from different objects with different Doppler shifts, due to having different relative velocities to the communicating station. If data symbol modulation is removed, the signal on any subcarrier frequency would still therefore be perceived to vary with time, and therefore possess a spectrum of finite width. This Doppler spectrum exists in the frequency domain also, but is very narrow even compared to a single OFDM subcarrier frequency spacing. For example, a typical subcarrier frequency spacing is 15 kHz, while a typical Doppler spectrum is only 100-200 Hz wide. The signal time variation that gives rise to the Doppler spectrum is from one OFDM symbol period to the next, and a total analysis interval of many OFDM symbol periods is required to resolve the Doppler spectrum.

The value of the amplitude and phase of a given sub-carrier frequency in a given OFDM symbol, ignoring data symbol modulation, is the result of the sum of many scattered waves of different phase and amplitude, and these may add constructively or destructively in each sub-carrier frequency bin. If the resultant phase and amplitude is plotted versus sub-carrier frequency, it will exhibit a frequency variation which is the channel frequency response. If the channel frequency response is inverse frequency transformed, the channel impulse response will be obtained. The impulse response indicates very approximately that the composite signal comprises the sum of a number of relatively delayed rays, and is a plot of phase and amplitude versus delay. This is therefore referred to as the Delay Domain.

Orthogonal Frequency Division Multiplexing (OFDM) is one method of reducing the complexity of equalizing methods needed to communicate high data rates in a multi-path channel. Using the transmitter 12 and receiver 14 described above, signals received from an OFDM transmitter 12 are applied to the Fourier transform unit 36 to produce a complex numerical value in each of the plurality of subcarrier frequency bins for each OFDM block period. For example, the receiver 14 may process data comprising a 1296 sub-carrier OFDM system having 15 kHz subcarrier frequency spacing, each OFDM symbol period thus being approximately 66.7 μs in duration (the reciprocal of 15 kHz). The total occupied bandwidth of such a signal is a little over 1296×15 kHz or 19.44 MHz, and therefore, the symbol period is 1/19.44 MHz, or 51.44 ns. For generating and analyzing such a signal, a 2048-point Fourier transform unit 36 may be used, leaving a margin for filtering as described above. In the above test system, every fourth subcarrier frequency contained a known pilot symbol, meaning that the phase of the pilot sub-carrier frequencies were set to values that were pre-agreed between receiver 14 and transmitter 12. Thus, 324 pilot symbols are transmitted per OFDM symbol interval of 66.7 μs. The pilot symbols are used to estimate the phase in adjacent channels by interpolation in both the frequency and time domain. To collect data from the test system, the complex value received for each pilot subcarrier frequency was averaged over 8 successive OFDM symbol periods to give one value per 8×66.7=533 μs. This is adequate sampling density for modest relative velocities between the transmitter 12 and receiver 14. Thus, as a first step in smoothing channel estimates, an average along the time domain of samples corresponding to the same frequency in the frequency domain was employed. This is typical of conventional channel estimation methods, but not the preferred implementation according to this invention.

If the 324 pilot symbols are extracted from the output of the receiver Fourier transform unit 36 and the known phase rotations of the pre-agreed pilot symbol pattern are removed, the result is an estimate of the transmission channel phase and attenuation at equally spaced points spaced 60 kHz apart along the frequency domain. These may be inverse frequency transformed to produce complex delay coefficients. In some CDMA and TDMA systems, these complex delay coefficients may represent a first estimate of the channel impulse response of the channel.

In some systems, the pilot symbols are equi-spaced in both a first half of the subcarriers and in a second half of the subcarriers, but the spacing between the first half and the second half is non-commensurate. This can be handled by treating the first half and second half symbols as two separate symbols with frequency displacement between the pilots of one half and the pilots of the other half. The method described herein can handle an arbitrary frequency displacement between the pilots of one symbol, or part symbol, and the pilots of another symbol, or part symbol, and still process them jointly to uncover a common set of scatterer delays. Moreover, when symbols that have already been decoded are included in the calculation, it is possible that all of the OFDM subcarrier frequencies can be used, and not just those bearing known pilot symbols.

Figure 5:
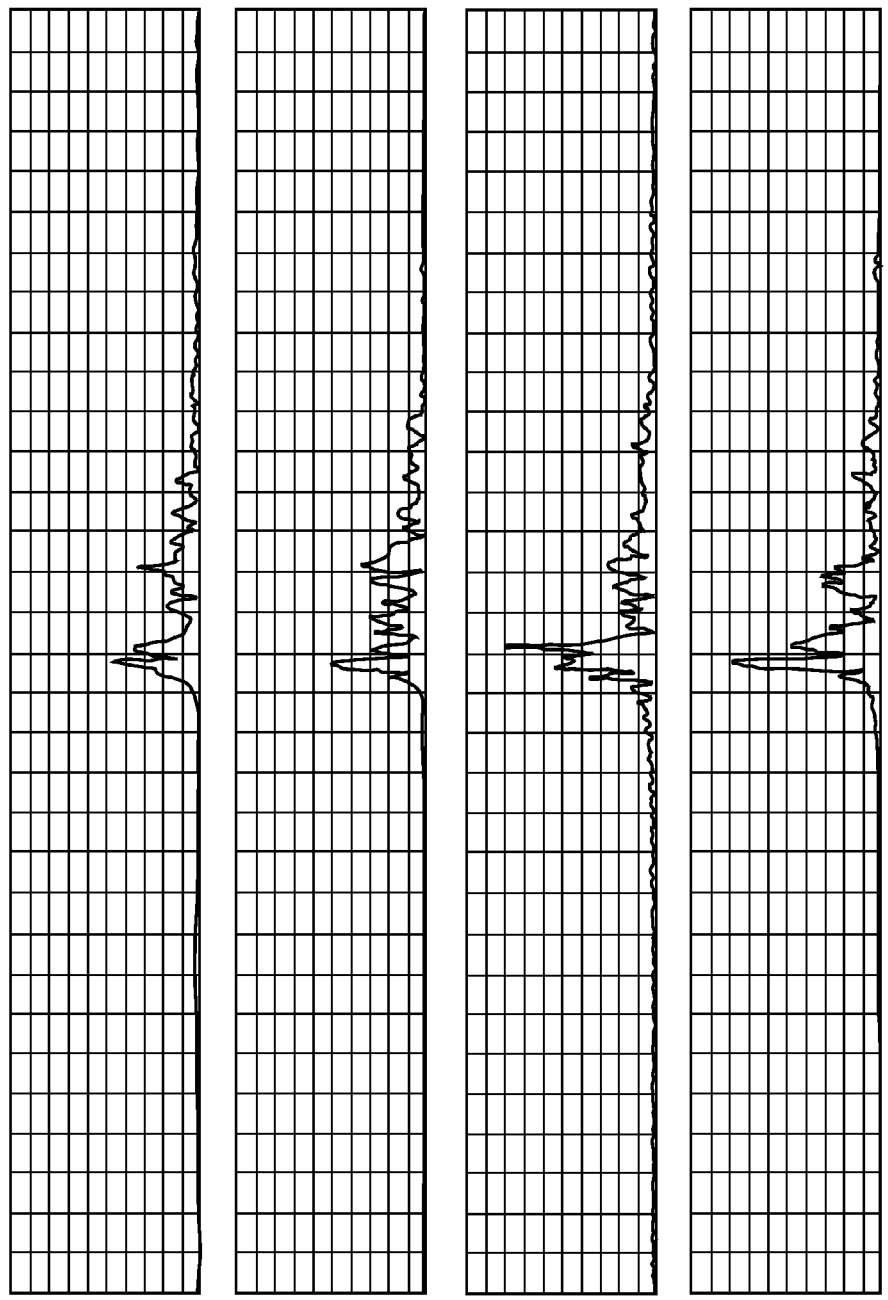
FIG. 5 shows measured channel impulse responses obtained from field test data.

FIG. 5 shows typical values of the impulse response magnitudes computed from field test data recorded while driving through Stockholm, Sweden. Only the magnitudes of the value for each delay bin are shown in FIG. 5, although the values are actually complex. Once the channel impulse response is known, it can be used to compute channel phases and amplitudes for the other subcarrier frequencies lying in between the pilot channels. These values are then used as channel phase references for the decoding of data symbols carried in the data-modulated subcarrier frequencies. As discussed above, noise or other impairments in these phase references may hinder the use of higher order modulations such as 256 QAM and/or the prediction of channel estimates for future time intervals.

Figure 6:
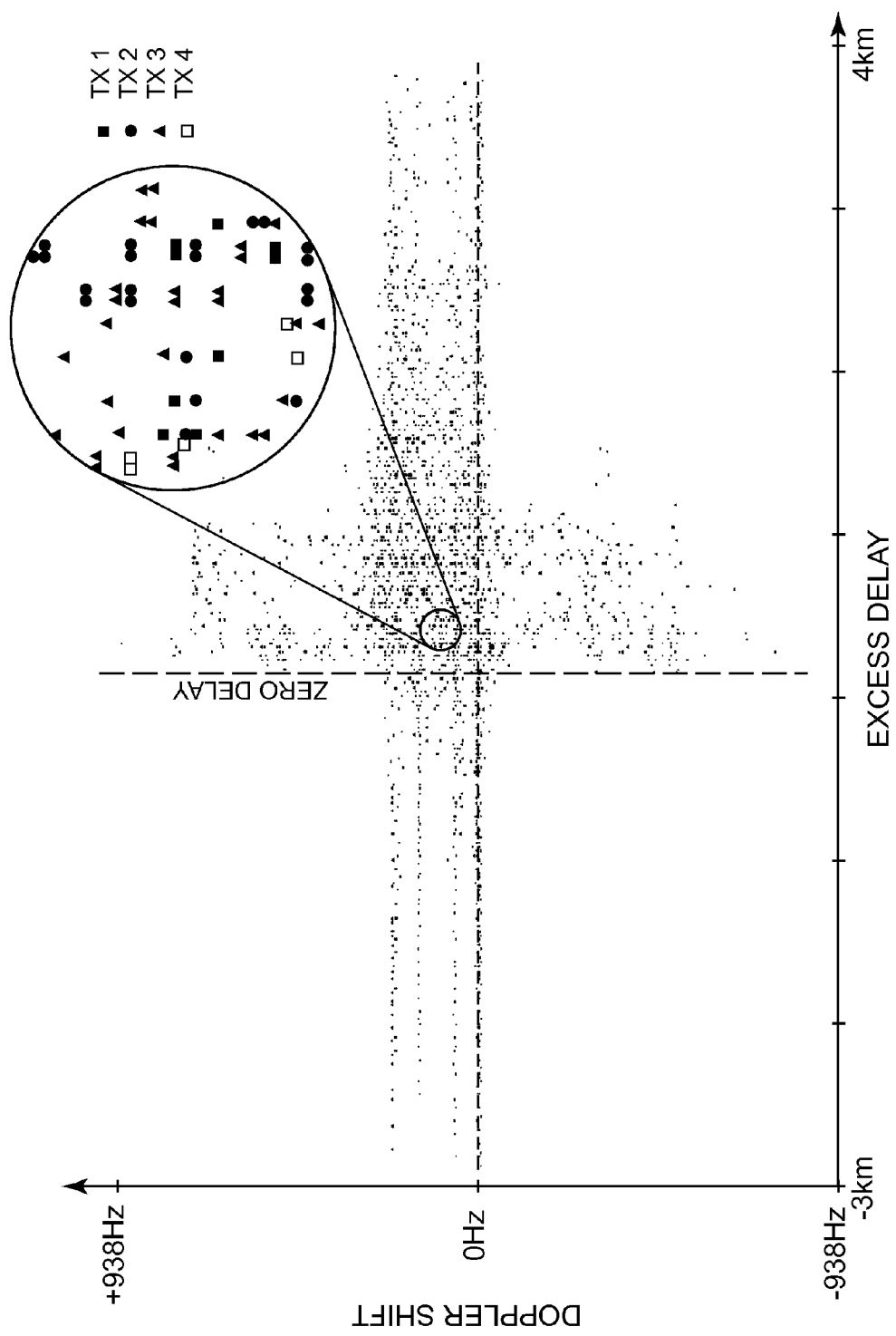
FIG. 6 maps the intensity of signal rays in the Doppler-domain.

Complex delay coefficients from successive time intervals may be stored to form a two dimensional array. Applying an individual time-to-frequency transform to the set of delay coefficients associated with individual delays results in a Doppler spectrum for each delay. The different Doppler spectrums for different delays may be collected into a new 2-D array called the Doppler parameter matrix. Because signal components are now separated by both delay and their relative velocities of the receiver 14 (or transmitter 12) with respect to their scattering objects 10, which is related to the bearing between the receiver 14 and the scattering object 10, the scattering objects 10 are now separated in two spatial dimensions (distance and angle) with the expectation that individual scattering objects 10 will now become resolvable. This indeed appears to be so, as shown in the plot of FIG. 6, which plots intensity of signal rays in the Doppler parameter matrix from a short segment of field test data comprising 40, 324 subcarrier frequencies, 8-symbol, partially pre-smoothed channel estimates collected over a period of 21.32 ms.

However, there exist a number of problems in using prior art frequency-to-time or time-to-frequency domain transforms to carry out the above. One problem is that conventional transform operations rely on the assumption that path delays will fall into equally-spaced time-bins, and likewise that Doppler frequencies will fall into equally-spaced frequency bins. For example, a fundamental assumption in Fourier analysis is that the entire function being transformed is the sum of harmonics of a common fundamental frequency, which means that the function is assumed to be repetitive with a repetition period that is the reciprocal of that common fundamental frequency. Consequently, attempts to use Fourier analysis of a function over samples 1 to N, which includes sample k, to predict the function for future sample N+k will merely return the same value as sample k, which is practically useless.

The algorithm known as Prony's algorithm implements a time-to-frequency transform that may be used to generate the Doppler parameter matrix without the assumption of equally spaced path delays or Doppler frequencies. Prony's algorithm has been traditionally applied to diverse fields such as Linear Predictive Speech Coding, direction finding using antenna arrays, and spectral analysis in Nuclear Magnetic Resonance Spectroscopy. A version in finite field arithmetic, known as the Massey-Berlekamp algorithm, is used for decoding Reed-Solomon error-correcting codes. The Prony algorithm is basically a method of spectral analysis that does not assume the spectrum falls into integrally-related frequency bins.

Unlike other transforms, the Prony algorithm is specifically formulated to spectrally analyze finite time segments of a signal, and therefore, gives precise results. The Prony algorithm decomposes the signal segment into a sum of exponentially decaying, exponentially growing, or static sinusoids which are all described by the expression:

$$Ce^{(\alpha+j\omega)t}, \qquad (1)$$

where C is a complex coefficient indicative of phase and amplitude, $\alpha$ is the exponential growth (+) or decay (−) rate factor, and $\omega$ is the angular frequency. Prony expresses a signal S(t) according to:

$$S(t) = \sum_{k=1}^{M} C_k e^{(\alpha_k + j\omega_k)t}. \qquad (2)$$

When the signal waveform is recorded at equally spaced intervals of time idt, Equation (2) becomes:

$$S_i = \sum_{k=1}^{M} C_k e^{(\alpha_k + j\omega_k)idt}. \qquad (3)$$

Letting $Z_k = e^{(\alpha_k + j\omega_k)dt}$, Equation (3) becomes:

$$S_i = \sum_{k=1}^{M} C_k Z_k^i. \qquad (4)$$

Many variations or improvements to Prony's algorithm have been reported, and a good compendium of these techniques may be found in Debasis Kundu's book "Computational Aspects in Statistical Signal Processing", Chapter 14. A modification of Prony's algorithm by Kundu and Mitra adapted to detect undamped sinusoids is reported in the above reference.

The present invention provides an inverse modified Prony algorithm for one exemplary frequency-to-time transform, where the inverse modified Prony algorithm is adapted to accept an input comprising channel values taken at equally spaced sample frequencies along the frequency domain, as in the OFDM test system described above, and to produce an output of delay domain parameters, comprising non-equally spaced delays and their associated complex delay coefficients (phase and amplitude of a delayed signal). The resulting non-equally spaced path delays are not restricted to multiples of any particular time interval, e.g., a 51.44 ns signal sampling period.

The inverse modified Prony algorithm described herein is different than that normally expressed by Equation (2) above. Normally, if one had obtained frequencies $Z_k$ and their associated amplitude/phase coefficients $C_k$ using Prony's analysis method, then the inverse, namely determining the signal at desired times t (other than the given times idt) would involve substituting the determined frequencies and coefficients into Equation (2). Equation (2) therefore represents the conventional inverse of the Prony frequency analysis procedure.

Equation (2) may also be written in term of $Z_k$ as:

$$S(t) = \sum_{k=1}^{M} C_k Z_k^t. \tag{5}$$

By contrast, the frequency-to-time transform described herein, referred to herein as an inverse modified Prony Algorithm, comprises an algorithm for determining the delays $T_i$ and their associated complex delay coefficients $S_{i,q}$ in the equation:

$$C_q(W) = \sum_{i=1}^{M} S_{i,q} e^{-j\omega T_i}. \tag{6}$$

Given the channel frequency response $C_{k,q}$ at instant q at N equally spaced sample frequencies $\omega_k = \omega_o + (k-1)\Delta\omega$, k= 1, ..., N, Equation (6) becomes:

$$C_{k,q} = \sum_{i=1}^{M} S_{i,q} e^{-j(\omega_o + (k-1)\Delta\omega)T_i}, k = 1, \ldots, N. \tag{7}$$

Defining $A_i = S_i e^{-j\omega_o T_i}$ and $Z_i = e^{-j\Delta\omega T_i}$, Equation (7) becomes:

$$C_k = \sum_{i=1}^{M} A_i Z_i^{k-1}, k = 1, \ldots, N. \tag{8}$$

Equation (8) does not yet represent the inverse modified Prony Algorithm described herein, but it does represent the inverse of the inverse modified Prony Algorithm. The inverse modified Prony Algorithm is a method of solving (e.g., inverting) Equation (8) for $Z_i$ and $A_{i,q}$ given $C_{k,q}$, and using Equation (9) to determine the path delays $T_i$ once $Z_i$ has been determined.

$$T_i = \frac{j\log(Z_i)}{\Delta\omega} \tag{9}$$

Equation (9) provides purely real values for $T_i$ as long as $Z_i$ is constrained to be purely imaginary. This means $Z_i$ should lie on the unit circle (i.e., magnitude=1) so that its logarithm will have a zero real part.

The above represents the time-frequency inverse of constraining Prony's algorithm to find only undamped sinusoids (e.g., all $\alpha_k = 0$ in Equation (2)). First, try adapting Prony's method to solve Equation (8). This proceeds by letting $T_i$ be the roots of a polynomial P(T) for i=1,..., M. The coefficients of this polynomial ($p_0, p_1, p_2, \ldots, p_M$) may be found by multiplying all factors $(T-T_1)(T-T_2) \ldots (T-T_M)$, given the $T_i$. Conversely, given the coefficients ($p_0, p_1, p_2, \ldots, p_M$), $T_i$ can be found by root-finding programs, which are well developed, reliable, and fast.

Forming $$p_0 C_{1,q} + p_1 C_{2,q} + p_2 C_{3,q} \ldots + p_M C_{M+1,q} = \sum_{k=0}^{M} p_k C_{k+1,q}, \tag{10}$$

and substituting $C_{k,q}$ from Equation (8) obtains:

$$\sum_{k=0}^{M} p_k \sum_{i=1}^{M} A_{i,q} Z_i^k. \tag{11}$$

By interchanging the order of summation, Equation (11) becomes:

$$\sum_{i=1}^{M} A_{i,q} \sum_{k=0}^{M} p_k Z_i^k = \sum_{i=1}^{M} A_{i,q} P(z_i). \tag{12}$$

However, by definition $z_i$ are the roots of P(z), and therefore, all $P(z_i)$ equal zero. Thus, $p_0 C_{1,q} + p_1 C_{2,q} + p_2 C_{3,q} \ldots + p_M C_{M+1,q} = 0$ represents one equation for the coefficients of P. Since this is true for any M+1 successive values of $C_{k,q}$, other equations may be obtained to solve for the coefficients, leading to:

$$\begin{bmatrix} C_1 & C_2 & C_3 & \ldots & C_{M+1} \\ C_2 & C_3 & C_4 & \ldots & C_{M+2} \\ C_3 & C_4 & C_5 & \ldots & C_{M+3} \\ \vdots & \vdots & \vdots & \ddots & \vdots \\ C_{N-M} & C_{N-M+1} & C_{N-M+2} & \ldots & C_N \end{bmatrix} \begin{pmatrix} p_0 \\ p_1 \\ p_2 \\ \vdots \\ p_M \end{pmatrix} = 0. \tag{13}$$

For simplicity, the index q has been dropped from the C-values in the matrix of Equation (13). It shall be understood, however, that all of the C-values in the matrix belong to the same ($q^{th}$) symbol period. Because the polynomial gives the same roots if scaled by an arbitrary factor, Prony proceeded to just let $p_0=1$ in Equation (13), moving it to the right hand side of the equation, and then solving for the remaining p values.

In "Mathematical Notes, Note 59," titled "An Improved Prony Algorithm for Exponential Analysis," Harold J. Price contends that the above-described solution according to Prony is non-optimum. Due to noise on the received signal, which corrupts the observed C-values, Equation (13) will not be satisfied exactly but should read:

$$\begin{bmatrix} C_1 & C_2 & C_3 & \ldots & C_{M+1} \\ C_2 & C_3 & C_4 & \ldots & C_{M+2} \\ C_3 & C_4 & C_5 & \ldots & C_{M+3} \\ \vdots & \vdots & \vdots & \ddots & \vdots \\ C_{N-M} & C_{N-M+1} & C_{N-M+2} & \ldots & C_N \end{bmatrix} \begin{pmatrix} p_0 \\ p_1 \\ p_2 \\ \vdots \\ p_M \end{pmatrix} = \varepsilon. \tag{14}$$

Then the desired solution should minimize the length of the error vector $\varepsilon$. Because it is the direction of the p vector, and not the length, that determines the roots of the polynomial, the search for the best p using Equation (14) should search only direction space while keeping the length of p unchanged, e.g., setting |p|=1.

The error vector length squared is given by $\epsilon^{\#}\epsilon=p^{\#}[C]^{\#}[C]p$. If p is normalized to unit length by dividing by its own length $\sqrt{p^{\#}p}$, then $$\varepsilon^{\#}\varepsilon = \frac{p^{\#}[C]^{\#}[C]p}{p^{\#}p}. \qquad (15)$$

Differentiating the above with respect to p (e.g., calculating the gradient with respect to p) and setting the gradient to zero provides an equation that is satisfied at the maxima and minima of the expression $(p^{\#}p)2[C]^{\#}[C]p-(p^{\#}[C]^{\#}[C]p)2p=0$, leading to:

$$[C]^{\#}[C]p = \frac{(p^{\#}[C]^{\#}[C]p)}{p^{\#}p}p = \lambda p, \qquad (16)$$

$$\text{where } \lambda = \frac{(p^{\#}[C]^{\#}[C]p)}{p^{\#}p}$$

is a real scalar. Equation (16) represents the definition of an eigenvector of a matrix, namely that the product of the matrix with a vector yields that same vector with just a length scaling by $\lambda$. Thus, the maxima and minima of $\epsilon^{\#}\epsilon$ occur when p is an eigenvector of $[C]^{\#}[C]$, and the associated eigenvalue is the value of $\epsilon^{\#}\epsilon$ at that point. The absolute minimum is thus obtained by choosing p to be the eigenvector associated with the smallest eigenvalue of $[C]^{\#}[C]$.

Equations (13) and (14) can first be simplified by requiring that all roots of P(z) have unit magnitude. This is physically justified for the present invention because the effect of a delayed ray adding to an undelayed ray is to create a sinusoidal variation of the channel frequency response along the frequency domain, and this sinusoidal curve is of constant amplitude, i.e., undamped. In the above-referenced book to Debasis Kundu, the polynomial P(z) is shown to be a conjugate palindrome in the case where all roots correspond to undamped sinusoids and lie on the unit circle. That is, the polynomial has the form $p_{M-i}=p^{*}_{i}$. To show this, consider that a single factor can be written in the form $z-e^{-j\Phi}$, or equivalently as $e^{j\Phi/2}z-e^{-j\Phi/2}=bz-b^{*}=(b,b^{*})$. A single factor, therefore, is evidently a conjugate palindrome. By the method of induction, if a conjugate palindromic polynomial of order N is still palindromic when extended to order N+1 through multiplication by one extra factor, such as $(b,b^{*})$, then the product of any number of such factors yields a conjugate palindrome.

Exploiting the conjugate palindromic property of P(z) is best achieved by writing out Equation (14) in terms of its real and imaginary parts, respectively indicated by R and I, as:

$$\left[\begin{bmatrix} CR_1 & \cdots & CR_{M/2} & -CI_1 & \cdots & -CI_{M/2} \\ \vdots & \ddots & \vdots & \vdots & \ddots & \vdots \\ CR_{N-M} & \cdots & CR_{N-M/2+1} & -CI_{N-M} & \cdots & -CI_{N-M/2+1} \\ CI_1 & \cdots & CI_{M/2} & CR_1 & \cdots & CR_{M/2} \\ \vdots & \ddots & \vdots & \vdots & \ddots & \vdots \\ CI_{N-M} & \cdots & CI_{N-M/2+1} & CR_{N-M} & \cdots & CR_{N-M/2+1} \end{bmatrix} + \begin{bmatrix} CR_{M+1} & \cdots & CR_{M/2+1} & CI_{M+1} & \cdots & CI_{M/2+1} \\ \vdots & \ddots & \vdots & \vdots & \ddots & \vdots \\ CR_N & \cdots & CR_{N-M/2+2} & CI_N & \cdots & CI_{N-M/2+2} \\ CI_{M+1} & \cdots & CI_{M/2+1} & -CR_{M+1} & \cdots & -CR_{M/2+1} \\ \vdots & \ddots & \vdots & \vdots & \ddots & \vdots \\ CI_N & \cdots & CI_{N-M/2+2} & -CR_N & \cdots & -CR_{N-M/2+2} \end{bmatrix}\right] \qquad (17)$$

$$\begin{pmatrix} PR_0 \\ \vdots \\ PR_{M/2} \\ PI_0 \\ \vdots \\ PI_{M/2} \end{pmatrix} = \varepsilon.$$

Equation (17) has the above form if M is even. When M is odd, there is a slight modification due to the center coefficient of the conjugate palindromic polynomial being real. Equation (17) has twice as many equations in the same number of variables, as before, but all quantities are real. Calling the matrix in Equation (17) Q, and denoting by q the vector of p-values arranged as in Equation (17), the error $\epsilon$ is now minimized when q is the eigenvector of $Q^{\#}Q$ associated with the smallest eigenvalue. Thus, the inverse modified Prony Algorithm described herein reduces to finding the eigenvectors of a real matrix, which, because of its block skew-symmetry and the fact that the blocks have the Hankel structure, may admit a more efficient solution than in the case of a matrix with no structure. If desired, Equation (17) may be rewritten by reverse-ordering $PR_0 \ldots PR_{M/2}$ and $PI_0 \ldots PI_{M/2}$, which makes the four partitions of each matrix Toeplitz instead of Hankel.

Once the eigenvector q is found, the conjugate palindromic polynomial P(Z) can be constructed and its roots $Z_i$ found. Then the delays $T_i$ are found using Equation (9). The amplitude/phase coefficients $A_i$ in Equation (8) then have to be found. Equation (8) can be written:

$$\begin{pmatrix} C_1 \\ C_2 \\ C_3 \\ \vdots \\ C_N \end{pmatrix} = \begin{bmatrix} 1 & 1 & 1 & \cdots & 1 \\ Z_1 & Z_2 & Z_3 & \cdots & Z_M \\ Z_1^2 & Z_2^2 & Z_3^2 & \cdots & Z_M \\ \vdots & \vdots & \vdots & \ddots & \vdots \\ Z_1^{N-1} & Z_2^{N-1} & Z_3^{N-1} & \cdots & Z_M^{N-1} \end{bmatrix} \begin{pmatrix} A_1 \\ A_2 \\ A_3 \\ \vdots \\ A_M \end{pmatrix}, \qquad (18)$$

which represents the equation for best-fitting a polynomial with M coefficients A to a set of N+1 data points C. Denoting the matrix in Equation (18) by Z, the solution is given by:

$$A=[Z^{\#}Z]^{-1}Z^{\#}C. \qquad (19)$$

Equation (19) is solved for each OFDM symbol period (or every few symbol periods if the values $C_k$ were the average over a number of successive symbol periods) to give the amplitude/phase coefficients of signals with the determined delays for each symbol period.

Because it is desired to further analyze the phase and amplitude values for each path delay along successive time periods, e.g., along successive OFDM symbol periods, we impose the additional constraint that the inverse modified Prony Algorithm shall produce the same path delay estimates for each time period, at least for a total evaluation period over which the delays can be assumed to change by negligible amounts. For example, a change in delay of 5 ns may occur due to a movement of 5 feet by the transmitter 12 or receiver 14, which movement would occur over the relatively long time interval of 56.8 ms at 60 mph. Despite the requirement that the determined path delays shall be the same over the evaluation period, the inverse modified Prony algorithm still allows the amplitudes and phases of the signal for each delay value to be determined independently for each successive time interval within the evaluation period. Therefore, we want to find P(z) according to Equations (13), (14), and (17) by including all of the pilot symbol amplitude/phase values $C_k$ for all OFDM symbols in the evaluation period, the resulting path delays being those path delays that best explain the signal in all of the OFDM symbols. This is done by adding blocks vertically to the matrices of Equations (13), (14), and (17) for each symbol period. Denoting the matrix in Equation (17) by Q1 for symbol period 1, Q2 for symbol period 2, etc., the solution q that we seek is the eigenvector associated with the smallest eigenvalue of:

$$\begin{bmatrix} Q1 \\ Q2 \\ Q3 \\ \vdots \\ QL \end{bmatrix}^{\#} \begin{bmatrix} Q1 \\ Q2 \\ Q3 \\ \vdots \\ QL \end{bmatrix} = \begin{bmatrix} Q1^{\#} & Q2^{\#} & Q3^{\#} & \ldots & QL^{\#} \end{bmatrix} \begin{bmatrix} Q1 \\ Q2 \\ Q3 \\ \vdots \\ QL \end{bmatrix} \quad (20)$$

$$= [Q1^{\#}Q1 \quad Q2^{\#}Q2 \quad Q3^{\#}Q3 \quad \ldots \quad QL^{\#}QL],$$

which will then yield the delay values which best fit all L successive symbol periods. Equation (19) may then be used with the common Z-roots but with their individual C-values to determine the amplitude/phase coefficients A separately for each symbol period.

After determining delays $T_i$ for L successive OFDM symbols, and their associated amplitude/phase coefficients $A_{i,q}$, the values of the original amplitude/phase values $S_{i,q}$ may be computed according to:

$$S_{i,q} = A_{i,q} e^{jW_o T_i} \quad (21)$$

for each OFDM symbol period q=1, . . . , L, obtaining the two-dimensional delay/time array $S_{i,q}$. By performing an analysis of each delay along the time dimension q=1, . . . , L, the Doppler parameters may be obtained. This is what is shown in FIG. 6. It is undesirable to constrain the Doppler frequencies to discrete bins. Thus, an application of Prony's frequency analysis procedure provides a preferred method of Doppler analysis. Further modifications to both the inverse modified Prony Algorithm for estimating the delay profile and the Prony Algorithm for estimating the Doppler spectrum are possible. For example, the paper "Exact Maximum Likelihood Parameters Estimation of Superimposed Exponential Signals in Noise" (Bresler and Macovksi, IEEE transactions on Acoustics and Signal Processing (1986), vol. 34, p 1081-1089, develops an algorithm called Iterative Quadratic Maximum Likelihood Estimation (IQML). This is derived from the Prony algorithm by noting that the determination of the polynomial P(z) first by solving Equation (14) for the least square error $\epsilon^{\#}\epsilon$, followed by the determination of the optimum coefficients A using Equation (19), does not guarantee that a different choice of polynomial coefficients could not have produced a lower residual least square error when using the solution of Equation (19) in Equation (18). To rectify this, following Bresler and Macovski, if the solution A from Equation (19) is used in Equation (8), the least square error obtained is given by $C^{\#}[I-Z(Z^{\#}Z)^{-1}Z^{\#}]C$. Now, defining a band matrix G having size N×(N−M) as:

$$G = \begin{bmatrix} p_0 & 0 & 0 & \ldots & \ldots & \ldots & 0 & 0 \\ p_1 & p_0 & 0 & \ldots & \ldots & \ldots & 0 & 0 \\ p_2 & p_1 & p_0 & \ldots & \ldots & \ldots & 0 & 0 \\ p_3 & p_2 & p_1 & & & & p_0 & 0 \\ \vdots & p_3 & p_2 & \ddots & & & p_1 & p_0 \\ p_M & \vdots & p_3 & & & & p_2 & p_1 \\ 0 & p_M & \vdots & & \ddots & & p_3 & p_2 \\ \vdots & 0 & p_M & & & & \vdots & p_3 \\ \vdots & \vdots & \vdots & & & & p_M & \vdots \\ 0 & 0 & 0 & \ldots & \ldots & \ldots & 0 & p_M \end{bmatrix} \quad (22)$$

it can be shown that $[I-Z(Z^{\#}Z)^{-1}Z^{\#}] = G(G^{\#}G)^{-1}G^{\cap}$. Furthermore, $C^{\#}G$ may be replaced by $g^{\#}[C]^{\#}$, where [C] comprises a (N−M)×(M+1) matrix given by:

$$[C] = \begin{bmatrix} C_1 & C_2 & C_3 & \ldots & C_{M+1} \\ C_2 & C_3 & C_4 & & C_{M+2} \\ C_3 & C_4 & C_5 & & C_{M+3} \\ \vdots & \vdots & \vdots & \ddots & \\ C_{N-M} & \ldots & \ldots & & C_N \end{bmatrix}, \quad (23)$$

which is the same matrix as in Equation (13), and where $g^{\#} = (p_0, p_1, p_2, \ldots, p_M)$. As a result, $C^{\#}[I-Z(Z^{\#}Z)^{-1}Z^{\#}]C = g^{\#}[C]^{\#}(G^{\#}G)^{-1}[C]g$. Minimizing this expression means that g should be chosen to be the eigenvector associated with the smallest eigenvalue of $[C]^{\#}(G^{\#}G)^{-1}[C]$, as opposed to $[C]^{\#}[C]$ in the above-mentioned improvement to Prony's algorithm proposed in the Howard J. Price reference.

Because G depends on g, the procedure is to find an initial approximation for g using, for example, Prony's method or Price's method, which is the equivalent to initializing $G^{\#}G$ to I, and then using that value of g to calculate G, followed by iteration. It is also desirable to restrict P, and therefore, g, to being conjugate palindromes, e.g., $$g = (p_0, p_1, p_2, \ldots p_{M/2}, p^{*}_{M/2}, \ldots, p^{*}_2, p^{*}_1, p_0), \quad (24)$$

if M is even and $$g = (p_0, p_1, p_2, \ldots p_{(M-1)/2}, p_{M/2}, p^{*}_{(M-1)/2}, \ldots, p^{*}_2, p^{*}_1, p_0), \quad (25)$$

if M is odd, where the center coefficient $p_{M/2}$ is real. Thus, when M is odd, Equation (17) will have one more value of PR to find than values of PI.

Once the matrix $[C]^{\#}(G^{\#}G)^{-1}[C]$ is found, it is partitioned as was the matrix [C] in Equation (17) in order to solve for the real and imaginary parts of the palindromic polynomial coefficients, and then iterated. Furthermore, it is desired that the same delay profile should hold for an evaluation period of L successive OFDM symbol periods, similar to Equation (20). Namely, letting QL equal the matrix [C] obtained from symbol period L, then the expression from Equation (20) should be used to obtain the starting value of g as the eigenvector associated with its smallest eigenvalue. Then g should be successively refined to be the eigenvector associated with the smallest eigenvalue of:

$$\sum_{q=1}^{L} Q_q^{\#}(G^{\#}G)^{-1}Q_q. \quad (26)$$

At each iteration, the above matrix should be partitioned as was the matrix [C] in Equation (17) in order to solve for the real and imaginary parts of the conjugate palindrome eigenvector g. Then G is recalculated for the next iteration. This constitutes the preferred version of the inverse modified Prony algorithm of the present invention, which is used by the present invention to determine a delay profile of non-equally spaced path delays consistent across an evaluation period of L OFDM symbol periods.

Figure 7:
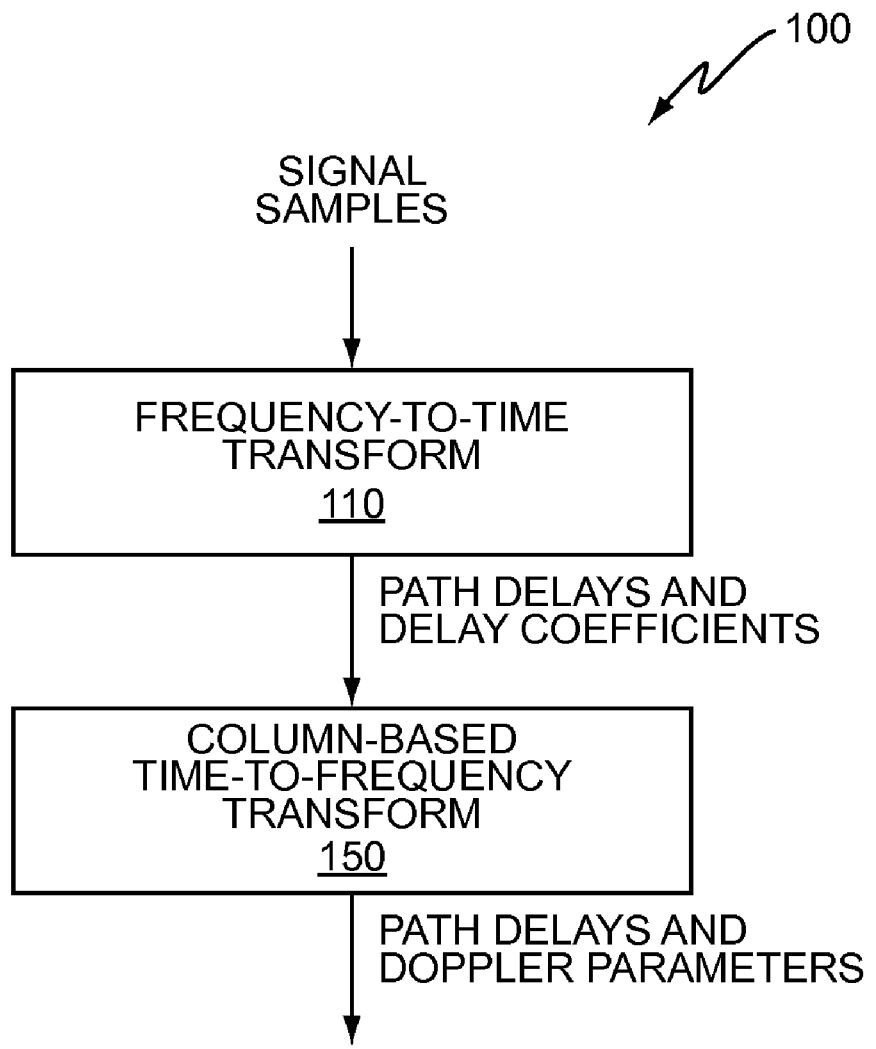
FIG. 7 shows an exemplary method for determining path delays and the corresponding Doppler parameters according to the present invention.

FIG. 7 provides a process 100 for determining path delays and Doppler parameters according to one exemplary embodiment of the present invention. Broadly, the process 100 includes applying a frequency-to-time transform to a plurality of received signal samples corresponding to a plurality of frequencies (e.g., OFDM signal samples in an OFDM symbol) to determine a set of non-equally spaced path delays and a set of associated complex delay coefficients (block 110). Each of the non-equally spaced path delays and its associated complex delay coefficient correspond to one or more scattering objects of the wireless communication channel. The complex delay coefficients and path delays are determined for multiple OFDM symbols in an evaluation period to provide a matrix of complex delay coefficients. The complex delay coefficients in a given column of the matrix correspond to a given path delay in the set of non-equally spaced path delays, and the complex delay coefficients in a given row correspond to a given OFDM symbol in the evaluation period.

Subsequently, process 100 applies a time-to-frequency transform to the complex delay coefficients in a column of the delay coefficient matrix to determine a set of Doppler parameters for that path delay (block 150). The Doppler parameters comprise a plurality of non-equally spaced Doppler frequencies and their corresponding complex scattering coefficients, where each Doppler frequency/complex scattering coefficient pair corresponds to a scattering object. The sets of Doppler parameters are collected into a matrix of Doppler parameters, where a given column of the Doppler parameter matrix corresponds to a given path delay in the set of non-equally spaced path delays.

Figure 8A:
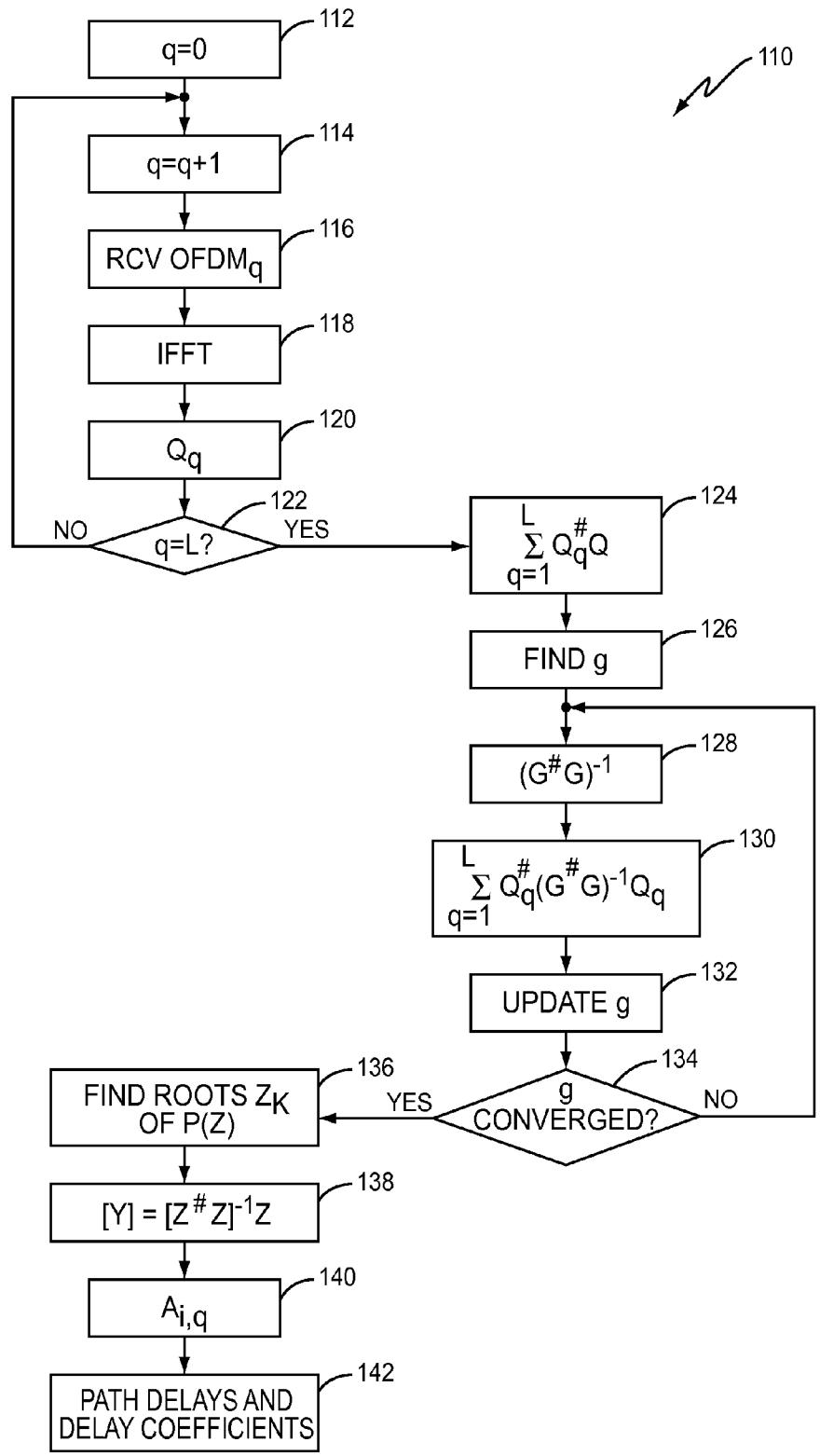
FIGS. 8A and 8B show details for implementing the transform methods of FIG. 7.
Figure 8B:
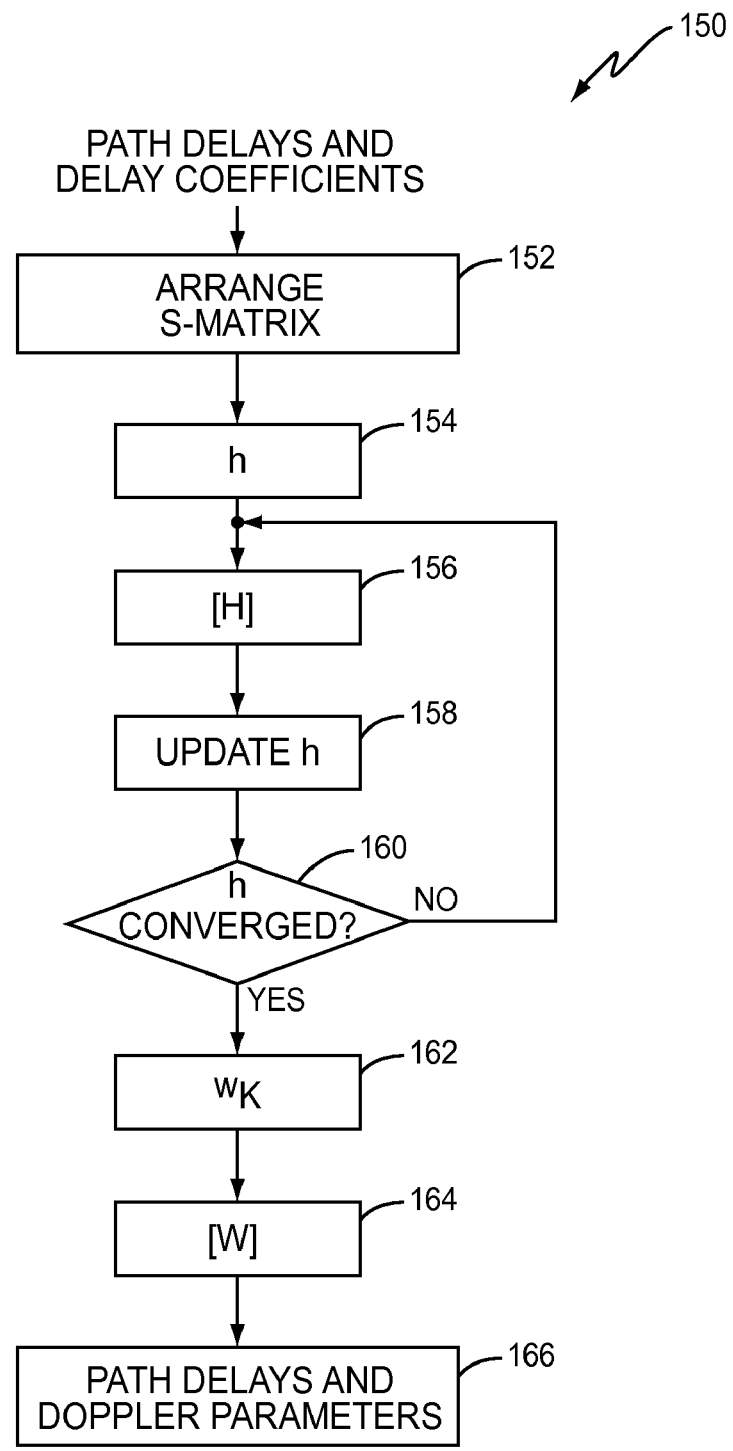
Figure 4:
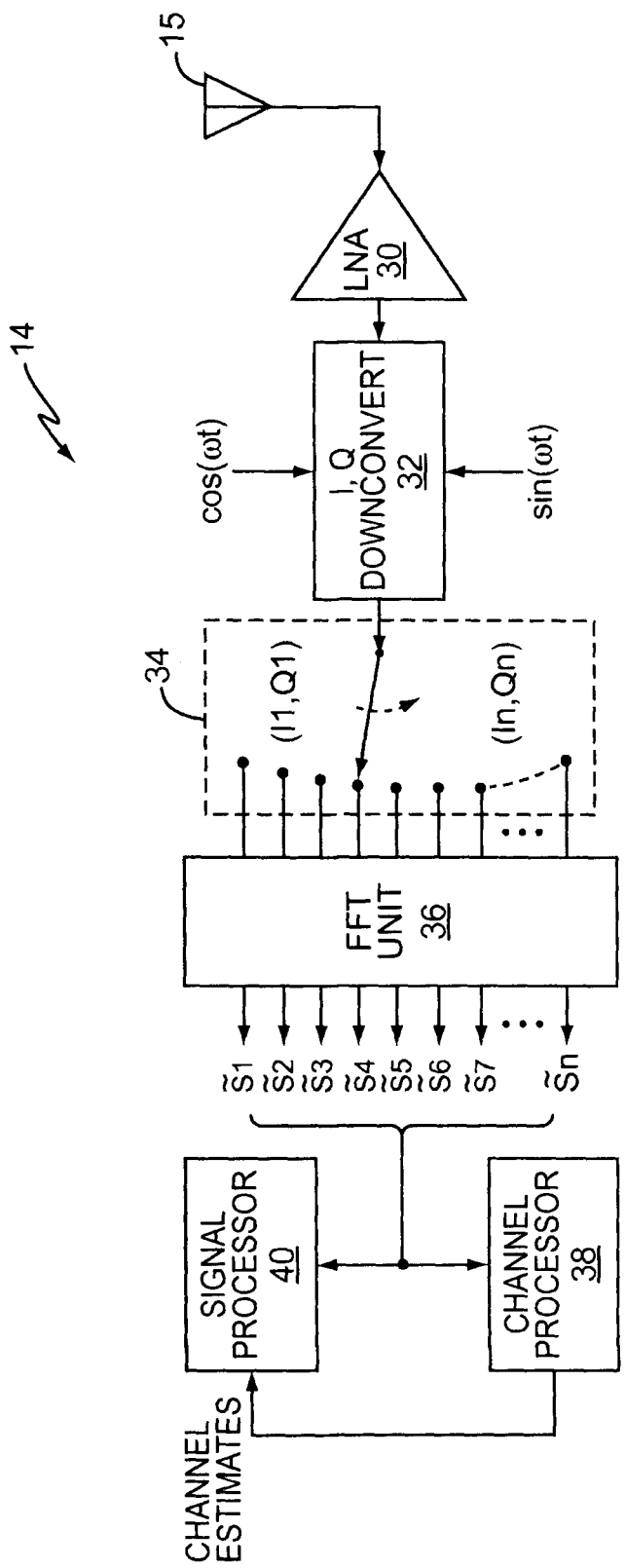

FIGS. 8A and 8B show details for implementing the frequency-to-time transform (block 110) and the time-to-frequency transform (block 150), respectively, according to one exemplary embodiment. In the embodiment of FIG. 8A, the frequency-to-time transform comprises the inverse modified Prony algorithm discussed above. In the embodiment of FIG. 8B, the time-to-frequency transform comprises the Prony algorithm discussed above. It will be appreciated, however, that the present invention is not limited to the Prony algorithms discussed herein. Instead, any transforms that determine the actual time and frequency data without restricting the time and frequency data to equally spaced and predefined bins may be used.

FIG. 8A shows the inverse modified Prony process 110 of the present invention. Before the process begins, the channel processor 38 initializes a counter (block 112) to track the OFDM symbols of the evaluation period. The channel processor 38 then increments the counter (block 114), receives OFDM symbol q (block 116), and processes the OFDM symbol using Fourier analysis to determine complex amplitude and phase coefficients $C_{k,q}$ for the k=1, ..., N pilot symbols in the symbol period (block 118). Channel processor 38 arranges the N C-values for symbol period q as per the matrix of Equation (14) to obtain the matrix $Q_q$ (block 120). The channel processor then repeats the process of blocks 114-120 until q=L (block 122).

After $Q_q$ has been formed for the L OFDM symbols of the evaluation period, the channel processor 38 forms the matrix sum $$\sum_{q=1}^{L} Q_q^\# Q_q,$$

and partitions the result as in Equation (17) into the sum of Toeplitz+Hankel matrices (block 124). Subsequently, the channel processor 38 finds the initial values of the conjugate palindromic polynomial coefficients g as the eigenvector of the Toeplitz+Hankel matrix partitioning associated with the smallest eigenvalue (block 126), uses g to form the matrix G, and computes $(G^\# G)^{-1}$ (block 128). Channel processor 38 then forms the matrix sum $$\sum_{q=1}^{L} Q_q^\# (G^\# G)^{-1} Q_q,$$

which represents cumulative noise whitened channel frequency responses, and partitions the result as in Equation (17) (block 130). After finding improved values of the conjugate palindromic polynomial coefficients g as the eigenvector of the partitioned matrix formed for block 130 associated with the smallest eigenvalue (block 132), the channel processor 38 repeats blocks 126-132 until a converged value of g is obtained (block 134).

The iterative procedure described by blocks 126-134 has a new, unique, and desirable property. Namely, this iterative procedure determines a set of path delays, common to the L OFDM symbol periods, that explain the L observed frequency responses with minimum total least square error, given that the amplitude/phase coefficients for each delay will be determined separately for each OFDM symbol period. This is due to the fact that $g^\# Q_1^\# (G^\# G)^{-1} Q_1 g$ is the square error for OFDM period q=1 when the path delays implied by g are used, after choosing the optimum amplitude/phase coefficients for period q=1. Likewise, $g^\# Q_2^\# (G^\# G)^{-1} Q_2 g$ is the square error for OFDM period q=2 when the path delays implied by g are used, after choosing the optimum amplitude/phase coefficients for period q=2, and so forth. Thus, $$\sum_{q=1}^{L} g^\# Q_q^\# (G^\# G)^{-1} Q_q g$$

is the square error summed over all L symbol periods when the path delays implied by g are used, given that the amplitude/phase coefficients associated with each delay have been optimized separately for each symbol period. Taking out g as a common factor gives $$g^\# \left[ \sum_{q=1}^{L} Q_q^\# (G^\# G)^{-1} Q_q \right] g.$$

Hence finding g to be the eigenvector associated with the smallest eigenvalue of the cumulative noise whitened channel frequency responses, as described by blocks 130-134 gives the solution with the desirable properties.

Returning back to the inverse modified Prony process 110, the channel processor 38 finds the roots $z_k$ of the conjugate palindromic polynomial P(z) whose coefficients are given by the converged value of g from block 134 (block 136). The channel processor 38 arranges the powers of the roots $z_k$ to form the matrix [Z] of Equation (18), and hence computes $[Y]=[Z^\# Z]^{-1} Z$ (block 138). Channel processor 38 uses the matrix [Y] computed for block 138 to find N coefficients $A_{i,q}$ for symbol period q from the corresponding coefficients $C_{k,q}$ obtained for block 118 for symbol period q, using Equation (19) (block 140). Namely, $A_{i,q}=[Y]C_{i,q}$, where ";" corresponds to MATLAB notation and indicates arranging $C_{k,q}$ values for all k=1, ..., N to form a vector of size N×1. Lastly, the channel processor 38 converts the coefficient vector values $A_{i,q}$ into corresponding complex delay coefficient values $S_{i,q}$ by using Equation (21) (block 142). Note: if the pilot symbols are not in the same sub-carrier frequency slots in each OFDM symbol period, but are displaced in a way that can be accounted for by using a different base frequency $\omega_o$ for each OFDM symbol, then the different $\omega_o$ values for each of the q symbol periods should be used for Equation (21) in this step.

Blocks 112-142 of FIG. 8A detail the inverse modified Prony algorithm, which provides an improved method of finding path delays and the associated complex delay coefficients that explain the observed channel frequency responses for one or more OFDM symbol periods. Further improvements are possible by performing a Doppler frequency analysis of the complex delay coefficients for each path delay over many symbol periods, using a second transform, namely a time-to-frequency transform such as provided by Prony's algorithm.

FIG. 8B proves details for the exemplary Prony process 150. Broadly, the channel processor 38 applies the Prony algorithm to the L complex delay coefficients $S_{i,q}$ corresponding to one path delay. More particularly, channel processor 38 arranges the L, S-values for path delay i into a matrix (block 152), as shown by Equation (27).

$$[S] = \begin{bmatrix} S_{i,1} & S_{i,2} & \cdots & S_{i,m+1} \\ S_{i,2} & S_{i,3} & \cdots & S_{i,m+2} \\ \vdots & & \ddots & \vdots \\ S_{i,L-m} & \cdots & \cdots & S_{i,L} \end{bmatrix} \quad (27)$$

The channel processor 38 then finds the eigenvector h associated with the smallest eigenvalue of $[S]^\#[S]$ (block 154), constructs an L×L matrix [H] by using h in place of g in Equation (22) (block 156), and finds an improved version of h as the eigenvector associated with the smallest eigenvalue of $[S]^\#[H^\#H]^{-1}[S]$ (block 158). The channel processor 38 repeats blocks 156-158 until h converges (block 160). Subsequently, the channel processor 38 finds the roots $w_k$ for k=1, . . . , m of the polynomial with coefficients of the converged h (block 162), and forms the L×m matrix [W] by using the roots $w_k$ in place of $z_k$ in Equation (18), and hence computes $[X]=[W^\#W]^{-1}W$ (block 164). Lastly, the channel processor 38 finds the m Doppler coefficients $D_i=(d1,d2, d3, \ldots, dm)^\#$ for path delay i from $D_i=[X]S_{i,:}$ where ";" means the values for the q=1, . . . , L symbol periods are stacked vertically to form a 1×L vector (block 166).

There are many mathematical devices available to reduce the computational effort needed for performing the transforms of FIGS. 8A and 8B. For example, in block 158 the matrix $[H^\#H]$ is Hermitian-symmetric Toeplitz, having only 2(L−m)−1 distinct element values, which represent the autocorrelation function of h* with h. The autocorrelation may be rapidly calculated by padding out h with zeros and using an FFT, according to known theory. Also, the inversion of the Hermitian-symmetric Toeplitz matrix $[H^\#H]$ can be carried out in $O(N^2)$ operations using Trench's algorithm. Furthermore, its inverse has to multiply another Toeplitz/Hankel matrix S, whose rows are shifts of each other. This multiplication may also be performed using fewer operations with the help of an FFT, as is well known, and by using the Gohberg-Semencul form of the inverse. The Fourier Transform of the Toeplitz generating sequence for S may be saved and used again when the result is pre-multiplied by $S^\#$.

At the conclusion of block 166, we have m Doppler parameters for each of M path delays, forming a two-dimensional m×M array, which is the Doppler-delay diagram of FIG. 6. Doppler-delay diagrams have been obtained from cellular telephone signals before, as reported in "Estimation of scatterer locations from urban array channel measurements at 1800 MHz", Henrik Asplundh and Jan-Erik Berg, conference proceedings of Radio Vetenskap och Kommunikation, (RVK99), pp. 136-140, Karlskrona, Sweden June 1999. These diagrams were obtained using more conventional transform operations. The Delay-Doppler analysis using Prony frequency analysis and the inverse modified Prony Algorithm described herein to compute a delay profile common to several successive OFDM symbols, is expected to yield superior results to those previously obtained. Because of the increased accuracy, the path delays and Doppler parameters obtained by the present invention may be used to determine channel estimates having the requisite accuracy to process higher order modulation (e.g., 256 QAM) signals and/or to accurately predict future channel estimates.

An objective of determining more accurate delay-Doppler analysis is to enable more precise channel estimation for decoding data. Having obtained the more accurate delay-Doppler profile, it is now filtered by one or other methods to reduce or eliminate noise. For example, elements corresponding to impossibly high Doppler values can be set to zero. Likewise, impossible delays, such as negative delays, may be eliminated, as may delays of unlikely high values. Also, some number of spectral coefficients may be selected based on predetermined criteria. For example, the N largest spectral coefficients may be selected, or a threshold may be used to select the spectral coefficients.

In still another embodiment, a Minimum Mean Square Error (MMSE) procedure may be applied to the Doppler parameter matrix. A simplified explanation of MMSE is as follows. A noise level in the Delay-Doppler diagram can be estimated either by reprocessing recently decoded data to determine the noise level on data symbols, or by looking at the values eliminated on the grounds of impossible or unlikely Doppler and delay. In the remaining values, it is not known whether a value of the same order as the RMS value of the estimated noise is a true scatterer or noise. Suppose the value is d. Then using a value αd in place of d when using the delay-Doppler profile to predict a received symbol value will create an expected signal estimation error squared of $(1-\alpha)^2|d|^2$ times the signal power S, while the noise power contribution will be reduced to $\alpha^2$ times the noise power N. The total error is thus $(1-\alpha)^2|d|^2S^2+\alpha^2N$. Differentiating with respect to α and equating to zero yields the value of α giving the least square error as:

$$\alpha = \frac{|d|^2}{|d|^2 + N/S}, \quad (28)$$

where N/S may be identified as the reciprocal of the signal-to-noise ratio that would be present on a Doppler-delay value of magnitude |d|=1. Thus, it may be concluded that the Doppler delay values should be scaled down in dependence on their signal to noise ratios and their amplitudes, such that smaller values are reduced much more than larger values. This is a "softer" method than just clipping out values below a threshold. Other variations of the MMSE method may be used taking account of the correlation matrices between error sources. When the delay-Doppler coefficients scaled by MMSE are employed to re-compute the channel estimate for any OFDM symbol period and subcarrier frequency, substantial reduction of noise on the channel estimate will be evident.

Having selected or weighted the Doppler-delay coefficients as above, the value of a Delay coefficient at some desired time instant (e.g., past, present or future) is computed by summing terms comprising the Doppler-Delay coefficient rotated in phase by the time difference between the reference time and the desired time instant multiplied by the Doppler frequency. Then to find the channel estimate for any OFDM subcarrier frequency, the sum is computed of terms, each of which is the just-found Delay coefficient for the desired time instant rotated in phase by the product of the subcarrier frequency multiplied by the associated path delay. When the desired time instant is a future instant, as was mentioned before, the use of conventional transforms, i.e., Fourier Transforms, for prediction of a function returns the same value as a past value of the function. This deficiency of the prior art was due to the use of equally-spaced bins for either delays, Doppler frequencies, or both. By using non-equally spaced bins according to the present invention, functions are not assumed to be repetitive, and thus a future prediction does not merely return a past value.

One application of the invention is thus the reduction of noise on channel estimates to facilitate the use of higher order modulations for increasing data rate. The invention may also be used for other purposes, for example, to predict the frequency response of the channel for some future symbol, or to determine the location of a mobile transmitter by performing the inventive analysis of the signal received from the mobile transmitter at a network station to identify a pattern of scattering objects 10, the pattern then being compared with a previously stored data base of scattering object patterns using a pattern recognition algorithm.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method implemented by a wireless receiver of processing multi-path signals received over a wireless communication channel, the method comprising:
generating a plurality of signal samples corresponding to a plurality of frequencies from a signal received by the wireless receiver; and
applying a frequency-to-time transform to the signal samples to determine a set of non-equally spaced path delays and a set of associated complex delay coefficients, each of said non-equally spaced path delays and its associated complex delay coefficient corresponding to one or more scattering objects of the wireless communication channel.

2. The method of claim 1 wherein generating the plurality of signal samples comprises generating an OFDM signal sample for multiple subcarrier frequencies of an OFDM symbol received at the wireless receiver, and wherein applying the frequency-to-time transform to the signal samples comprises applying the frequency-to-time transform to the OFDM signal samples to determine the non-equally spaced path delays and associated complex delay coefficients.

3. The method of claim 2 wherein two or more of the non-equally spaced path delays comprise path delays corresponding to non-integer multiples of a signal sampling period.

4. The method of claim 2 further comprising determining a matrix of complex delay coefficients by applying the frequency-to-time transform to the OFDM signal samples over a plurality of received OFDM symbols, wherein the complex delay coefficients in a given row of said matrix correspond to the non-equally spaced path delays determined for a given OFDM symbol.

5. The method of claim 4 wherein applying the frequency-to-time transform to the OFDM signal samples comprises individually applying the frequency-to-time transform to the OFDM signal samples associated with individual OFDM symbols.

6. The method of claim 4 wherein applying the frequency-to-time transform to the OFDM signal samples comprises jointly applying the frequency-to-time transform to the OFDM signal samples generated for each OFDM symbol to jointly determine said non-equally spaced path delays while individually determining said associated complex delay coefficients in said delay coefficient matrix, wherein the complex delay coefficients in a given column of said delay coefficient matrix correspond to a given path delay in said set of non-equally spaced path delays.

7. The method of claim 6 further comprising applying a time-to-frequency transform to the complex delay coefficients in individual columns of the delay coefficient matrix to determine individual sets of Doppler parameters for the individual path delays in said set of non-equally spaced path delays, wherein each set of Doppler parameters comprise a plurality of non-equally spaced Doppler frequencies and their corresponding complex scattering coefficients, and wherein each complex scattering coefficient corresponds to a respective scattering object.

8. The method of claim 7 further comprising collecting the individual sets of Doppler parameters into a matrix of Doppler parameters, wherein a given column of the Doppler parameter matrix corresponds to an individual set of Doppler parameters for a given path delay.

9. The method of claim 8 further comprising:
selecting a plurality of the spectral coefficients from the Doppler parameter matrix based on a predetermined criterion;
selecting a desired time instant; and
combining the selected spectral coefficients based on the desired time instant to predict complex delay coefficients for one or more path delays at the desired time instant.

10. The method of claim 9 wherein the desired time instant comprises a future time instant.

11. The method of claim 9 wherein selecting the plurality of spectral coefficients from the Doppler parameter matrix comprises selecting the spectral coefficients from the Doppler parameter matrix that meet or exceed a predetermined threshold.

12. The method of claim 9 wherein selecting the plurality of spectral coefficients from the Doppler parameter matrix comprises selecting the N largest spectral coefficients from the Doppler parameter matrix.

13. The method of claim 8 further comprising:
applying a minimum mean squared error process to the Doppler parameter matrix to generate a weighted set of spectral coefficients;
selecting a desired time instant; and
combining the spectral coefficients in the weighted set based on the desired time instant to predict channel impulse responses for one or more path delays at the desired time instant.

14. The method of claim 13 wherein the desired time instant comprises a future time instant.

15. The method of claim 6 wherein jointly applying the frequency-to-time transform to the OFDM signal samples comprises jointly applying an inverse modified Prony algorithm to the OFDM signal samples generated for each OFDM symbol.

16. The method of claim 1 wherein applying the frequency-to-time transform to the signal samples comprises applying an inverse modified Prony algorithm to the signal samples.

17. A wireless receiver configured to process multi-path signals received over a wireless communication channel, the wireless receiver comprising:
   one or more front-end receiver elements configured to generate a plurality of signal samples corresponding to a plurality of frequencies from a signal received by the wireless receiver; and
   a channel processor configured to apply a frequency-to-time transform to the signal samples to determine a set of non-equally spaced path delays and a set of associated complex delay coefficients, each of said non-equally spaced path delays and its associated complex delay coefficient corresponding to one or more scattering objects of the wireless communication channel.

18. The wireless receiver of claim 17 wherein the front-end receiver elements are configured to generate the plurality of signal samples by generating an OFDM signal sample for multiple subcarrier frequencies of an OFDM symbol received at the wireless receiver, and wherein the channel processor is configured to apply the frequency-to-time transform to the signal samples by applying the frequency-to-time transform to the OFDM signal samples to determine the non-equally spaced path delays and associated complex delay coefficients.

19. The wireless receiver of claim 18 wherein two or more of the non-equally spaced path delays comprise path delays corresponding to non-integer multiples of a signal sampling period.

20. The wireless receiver of claim 18 wherein the channel processor is further configured to determine a matrix of complex delay coefficients by applying the frequency-to-time transform to the OFDM signal samples over a plurality of received OFDM symbols, wherein the complex delay coefficients in a given row of said matrix correspond to the non-equally spaced path delays determined for a given OFDM symbol.

21. The wireless receiver of claim 20 wherein the channel processor is configured to apply the frequency-to-time transform to the OFDM signal samples by individually applying the frequency-to-time transform to the OFDM signal samples associated with individual OFDM symbols.

22. The wireless receiver of claim 20 wherein the channel processor is configured to apply the frequency-to-time transform to the OFDM signal samples by jointly applying the frequency-to-time transform to the OFDM signal samples generated for each OFDM symbol to jointly determine said non-equally spaced path delays while individually determining said associated complex delay coefficients in said delay coefficient matrix, wherein the complex delay coefficients in a given column of said delay coefficient matrix correspond to a given path delay in said set of non-equally spaced path delays.

23. The wireless receiver of claim 22 wherein the channel processor is further configured apply a time-to-frequency transform to the complex delay coefficients in individual columns of the delay coefficient matrix to determine individual sets of Doppler parameters for the individual path delays in said set of non-equally spaced path delays, wherein each set of Doppler parameters comprise a plurality of non-equally spaced Doppler frequencies and their corresponding complex scattering coefficients, and wherein each complex scattering coefficient corresponds to a respective scattering object.

24. The wireless receiver of claim 23 wherein the channel processor is further configured to collect the individual sets of Doppler parameters into a matrix of Doppler parameters, wherein a given column of the Doppler parameter matrix corresponds to an individual set of Doppler parameters for a given path delay.

25. The wireless receiver of claim 24 wherein the channel processor is further configured to:
   select a plurality of the spectral coefficients from the Doppler parameter matrix based on a predetermined criterion;
   select a desired time instant; and
   combine the selected spectral coefficients based on the desired time instant to predict complex delay coefficients for one or more path delays at the desired time instant.

26. The wireless receiver of claim 25 wherein the desired time instant comprises a future time instant.

27. The wireless receiver of claim 25 wherein the channel processor is configured to select the plurality of spectral coefficients from the Doppler parameter matrix by selecting the spectral coefficients from the Doppler parameter matrix that meet or exceed a predetermined threshold.

28. The wireless receiver of claim 25 wherein the channel processor is configured to select the plurality of spectral coefficients from the Doppler parameter matrix by selecting the N largest spectral coefficients from the Doppler parameter matrix.

29. The wireless receiver of claim 24 wherein the channel processor is further configured to:
   apply a minimum mean squared error process to the Doppler parameter matrix to generate a weighted set of spectral coefficients;
   select a desired time instant; and
   combine the spectral coefficients in the weighted set based on the desired time instant to predict channel impulse responses for one or more path delays at the desired time instant.

30. The wireless receiver of claim 29 wherein the desired time instant comprises a future time instant.

31. The wireless receiver of claim 22 wherein the channel processor is configured to jointly apply the frequency-to-time transform to the OFDM signal samples by jointly applying an inverse modified Prony algorithm to the OFDM signal samples generated for each OFDM symbol.

32. The wireless receiver of claim 17 wherein the channel processor is configured to apply the frequency-to-time transform to the signal samples by applying an inverse modified Prony algorithm to the signal samples.

* * * * *

UNITED STATES PATENT AND TRADEMARK OFFICE
CERTIFICATE OF CORRECTION

PATENT NO.       : 8,379,782 B2
APPLICATION NO.  : 12/478473
DATED            : February 19, 2013
INVENTOR(S)      : Dent et al.

It is certified that error appears in the above-identified patent and that said Letters Patent is hereby corrected as shown below:

In the Drawings:

In Fig. 4, Sheet 4 of 9, delete " REPLACEMENT SHEET 4/9 ". (As shown on the attached sheet)

In the Specifications:

In Column 5, Line 32, delete "U.S. Pat. No." and insert --U.S. Pat. Nos.--, first instance and second instance delete "U.S. Pat. No.".

In Column 5, Line 33, before "5,084,669,", delete "U.S. Pat. No.".

In Column 11, Line 34, delete " $A_i = S_i e^{-j\omega_a T_i}$ and $Z_i = e^{-j\lambda\omega T_i}$, " and insert -- $A_i = S_i e^{-j\omega_o T_i}$ and $Z_i = e^{-j\Delta\omega T_i}$, --, therefor.

In Column 14, Line 32-35, in Equation (18) delete "
$$\begin{vmatrix} 1 & \cdots & 1 \\ Z_3 & \cdots & Z_M \\ Z_3^2 & \cdots & Z_M \end{vmatrix} \begin{pmatrix} A_1 \\ A_2 \\ A_3 \end{pmatrix},$$
" and insert --
$$\begin{vmatrix} 1 & \cdots & 1 \\ Z_3 & \cdots & Z_M \\ Z_3^2 & \cdots & Z_M^2 \end{vmatrix} \begin{pmatrix} A_1 \\ A_2 \\ A_3 \end{pmatrix},$$
--, therefor.

Signed and Sealed this
Second Day of July, 2013

Teresa Stanek Rea
*Acting Director of the United States Patent and Trademark Office*

CERTIFICATE OF CORRECTION (continued)
U.S. Pat. No. 8,379,782 B2

In Column 16, Line 1, delete "$G^{\cap}$." and insert -- $G^{\#}$. --, therefor.

In Column 18, Line 64, delete "$[Y]C_{i,q}$," and insert -- $[Y]C_{:,q}$, --, therefor.